United States Patent
Zheng et al.

(10) Patent No.: US 11,532,156 B2
(45) Date of Patent: Dec. 20, 2022

(54) METHODS AND SYSTEMS FOR FIRE DETECTION

(71) Applicant: ZHEJIANG DAHUA TECHNOLOGY CO., LTD., Zhejiang (CN)

(72) Inventors: Jia Zheng, Hangzhou (CN); Jianguo Tian, Hangzhou (CN); Huadong Pan, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 111 days.

(21) Appl. No.: 16/578,228

(22) Filed: Sep. 20, 2019

(65) Prior Publication Data
US 2020/0012859 A1 Jan. 9, 2020

Related U.S. Application Data

(63) Continuation of application No. PCT/CN2017/086315, filed on May 27, 2017.

(30) Foreign Application Priority Data

Mar. 28, 2017 (CN) .......................... 201710193196.4

(51) Int. Cl.
 *G06V 10/22* (2022.01)
 *G06V 20/52* (2022.01)
 (Continued)

(52) U.S. Cl.
 CPC .............. *G06V 20/20* (2022.01); *G06V 10/22* (2022.01); *G06V 20/188* (2022.01); *G06V 20/52* (2022.01); *G06V 20/194* (2022.01); *G08B 17/005* (2013.01)

(58) Field of Classification Search
 CPC .... G08B 17/125; G08B 17/005; G08B 25/08; G06K 9/00771; G06K 9/00657;
 (Continued)

(56) References Cited

U.S. PATENT DOCUMENTS 5,734,335 A 3/1998 Brogi et al.
5,926,280 A 7/1999 Yamagishi et al.
(Continued)

FOREIGN PATENT DOCUMENTS

CN 101587622 A * 11/2009
CN 101833838 A 9/2010
(Continued)

OTHER PUBLICATIONS

Yu, Chunyu, Zhibin Mei, and Xi Zhang. "A real-time video fire flame and smoke detection algorithm." Procedia Engineering 62 (2013): 891-898. (Year: 2013).*
(Continued)

*Primary Examiner* — Vu Le
*Assistant Examiner* — Tracy Mangialaschi
(74) *Attorney, Agent, or Firm* — Metis IP LLC

(57) ABSTRACT

In accordance with various aspects of the present disclosure, methods and systems for fire detection are disclosed. In some embodiments, a method for fire detection includes: acquiring data related to a monitored area, wherein the data comprises image data related to the monitored area; determining, based on the acquired data, whether a first mode or a second mode is to be executed for fire detection, wherein the first mode comprises a first smoke detection, and the second mode comprises a first flame detection; and executing, by a hardware processor, at least one of the first mode or the second mode based on a result of the determination.

18 Claims, 12 Drawing Sheets

(51) Int. Cl.
  *G06V 20/10* (2022.01)
  *G08B 17/00* (2006.01)
  *G06V 20/20* (2022.01)

(58) Field of Classification Search
  CPC ............. G06K 9/6284; G06K 9/00671; G06K 9/2054; G06K 2009/00644; G06V 10/22; G06V 10/764; G06V 20/188; G06V 20/20; G06V 20/52; G06V 20/194
  See application file for complete search history.

(56) References Cited

U.S. PATENT DOCUMENTS

| | | | |
|---|---|---|---|
| 6,680,671 | B2 | 1/2004 | Okamoto et al. |
| 6,807,286 | B1 | 10/2004 | Krumm et al. |
| 6,937,743 | B2 | 8/2005 | Rizzotti et al. |
| 7,286,050 | B2 | 10/2007 | Faltesek |
| 7,542,585 | B2 | 6/2009 | Chen |
| 7,729,510 | B2 | 6/2010 | Zakrzewski et al. |
| 7,782,197 | B2 | 8/2010 | Lang et al. |
| 7,786,877 | B2 | 8/2010 | Hou |
| 7,834,771 | B2 | 11/2010 | Lee |
| 7,991,187 | B2 | 8/2011 | Hou |
| 8,004,563 | B2 | 8/2011 | Talmon et al. |
| 8,368,757 | B2 | 2/2013 | Graser et al. |
| 8,369,567 | B1 | 2/2013 | Buck et al. |
| 8,538,063 | B2 | 9/2013 | Caballero et al. |
| 2003/0190076 | A1 | 10/2003 | DeLean |
| 2006/0176169 | A1 | 8/2006 | Doolin et al. |
| 2008/0157984 | A1 | 7/2008 | Li et al. |
| 2010/0098335 | A1* | 4/2010 | Yamagishi ........... G08B 17/125 382/168 |
| 2011/0112660 | A1 | 5/2011 | Bergmann et al. |
| 2013/0321149 | A1 | 12/2013 | Ben-Shmuel et al. |
| 2013/0336526 | A1* | 12/2013 | Cetin ................. G06K 9/00147 382/103 |
| 2018/0260963 | A1* | 9/2018 | Bai ...................... G06K 9/4652 |

FOREIGN PATENT DOCUMENTS

| | | | |
|---|---|---|---|
| CN | 101872526 | A | 10/2010 |
| CN | 101587622 | B | 9/2012 |
| CN | 102653869 | A | 9/2012 |
| CN | 202434011 | U | 9/2012 |
| CN | 103116746 | A | 5/2013 |
| CN | 103400111 | A * | 11/2013 |
| CN | 103778418 | A | 5/2014 |
| CN | 103886598 | A | 6/2014 |
| CN | 103956016 | A | 7/2014 |
| CN | 106339657 | A | 1/2017 |
| CN | 106408846 | A | 2/2017 |
| KR | 100638120 | B1 | 10/2006 |
| KR | 101309407 | B1 | 9/2013 |
| WO | 1991009390 | A1 | 6/1991 |
| WO | 1997035433 | A1 | 9/1997 |
| WO | 2010015742 | A1 | 2/2010 |
| WO | 2014179482 | A1 | 11/2014 |

OTHER PUBLICATIONS

Piccinini, Paolo, Simone Calderara, and Rita Cucchiara. "Reliable smoke detection in the domains of image energy and color." 2008 15th IEEE International Conference on Image Processing. IEEE, 2008. (Year: 2008).*

Wang, Lin, et al. "Fire detection in video using fuzzy pattern recognition." International Conference on Oriental Thinking and Fuzzy Logic. Springer, Cham, 2016. (Year: 2016).*

Brovko, N., R. Bogush, and S. Ablameyko. "Smoke detection in video based on motion and contrast." Journal of Computer Science and Cybernetics 28.3 (2012): 195-205. (Year: 2012).*

The Extended European Search Report in European Application No. 17902660.4 dated Jan. 22, 2020, 7 pages.

Tasdemir K et al., Video based fire detection at night, IEEE 17th Signal Processing and Communications Applications Conference, 2009, pp. 720-723.

Qin Hu et al., A Smoke and Fire Detection Method Based on Dynamic Texture, Fire Science and Technology, 33(6):667-669, 2014.

International Search Report in PCT/CN2017/086315 dated Jan. 3, 2018, 4 pages.

Written Opinion in PCT/CN2017/086315 dated Jan. 8, 2018, 4 pages.

First Office Action in Chinese Application Na. 201710193196.4 dated Apr. 1, 2019, 17 pages.

* cited by examiner

METHODS AND SYSTEMS FOR FIRE DETECTION

CROSS-REFERENCE TO RELATED APPLICATIONS

The application is a Continuation Application of International Application No. PCT/CN2017/086315, filed on May 27, 2017, which claims priority of Chinese Application No. CN201710193196.4 filed on Mar. 28, 2017, the entire contents of each of which are hereby incorporated by reference.

TECHNICAL FIELD

The present disclosure generally relates to image processing, and more particularly, to fire detection using image processing techniques.

BACKGROUND

Fast and continuous establishment of industrial business and home buildings may have contributed to an increasing number of fire incidents. In addition, significant climate change may have caused increasingly destructive wildfires globally. Accordingly, it would be desirable to provide new mechanisms for fire detection.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some embodiments, a method for fire detection is disclosed. The method includes: acquiring data related to a monitored area, wherein the data comprises image data related to the monitored area; determining, based on the acquired data, whether a first mode or a second mode is to be executed for fire detection, wherein the first mode comprises a first smoke detection, and wherein the second mode comprises a first flame detection; and executing, by a hardware processor, at least one of the first mode or the second mode based on the determination.

In some embodiments, determining whether the first mode or the second mode is to be executed further includes determining whether the acquired data corresponds to daytime or nighttime.

In some embodiments, the method further includes determining whether the first mode or the second mode is to be executed based on at least one of the image data, timing information related to the image data, or environmental brightness.

In some embodiments, the first smoke detection includes identifying a foreground image based on the image data; generating a foreground accumulation image based on the foreground image; and identifying a candidate smoke region based on the foreground accumulation image.

In some embodiments, the first smoke detection further includes conducting color analysis on the candidate smoke region.

In some embodiments, the first mode further includes a second smoke detection. The second smoke detection includes dividing the candidate smoke region into a plurality of blocks; conducting at least one of smoke energy analysis or smoke diffusion analysis on the blocks; and determining a potential smoke region based on at least one of the smoke energy analysis or the smoke diffusion analysis.

In some embodiments, the second smoke detection further includes processing a portion of the image data that relates to the potential smoke region using a classifier.

In some embodiments, the first flame detection includes generating a background image based on the image data; generating a highlight background region based on the background image; producing a foreground image based on the background image; and identifying a candidate flame region based on at least one of the highlight background region or the foreground image.

In some embodiments, the second mode further includes a second flame detection. The second flame detection includes acquiring a highlight edge region related to the highlight background region; identifying a foreground accumulation image based on the candidate flame region; determining a flicker foreground image based on at least one of the highlight edge region or the foreground accumulation image; and processing image data related to the flicker foreground image using a classifier.

In some embodiments, the method further includes performing skyline detection on the image data to identify a portion of the image data corresponding to an area for the fire detection.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of example in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "module" and/or "unit" used herein are one method to distinguish different components, elements, parts, section or assembly of different level in ascending order. However, the terms may be displaced by another expression if they may achieve the same purpose.

It will be understood that when a device, unit or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Figure 1:
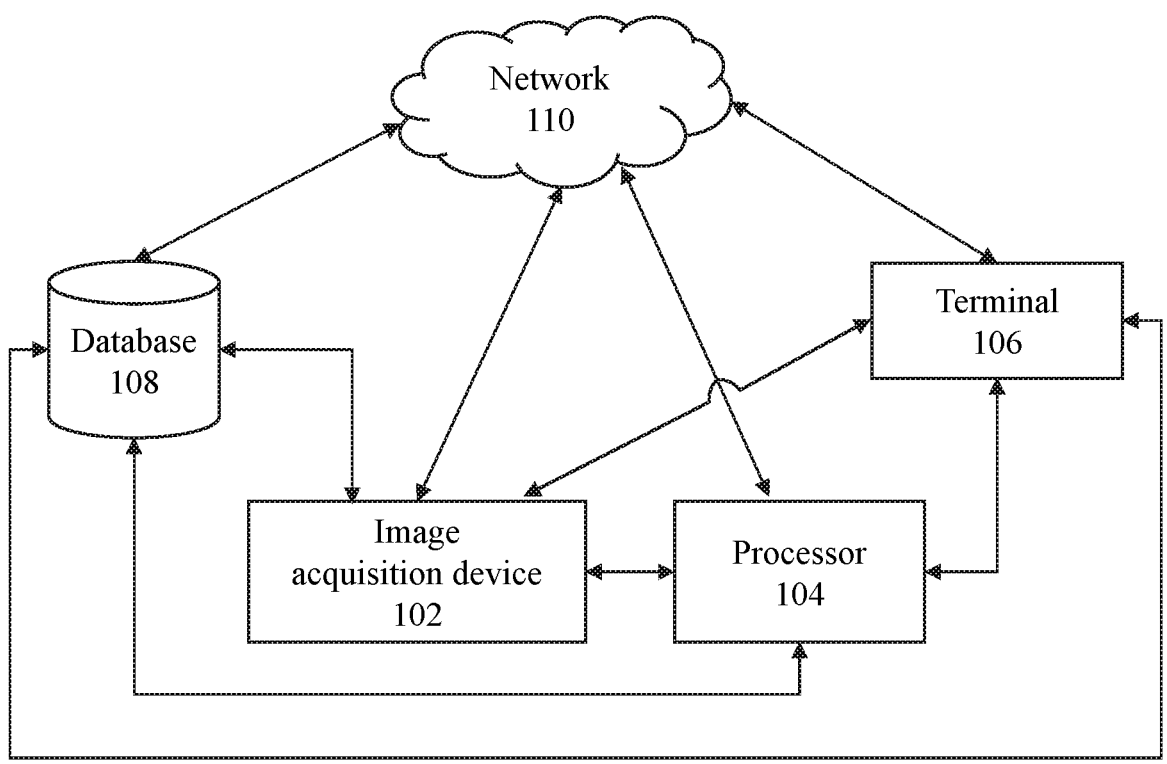
FIG. 1 is a generalized block diagram of an example of a system for fire detection in accordance with some embodiments of the disclosed subject matter.

FIG. 1 is a generalized block diagram of an example 100 of a system for fire detection in accordance with some embodiments of the disclosed subject matter. Fire detection system 100 may be used in various places including, for example, forests, grasslands, public places. As illustrated in FIG. 1, fire detection system 100 may include one or more image acquisition devices 102, processors 104, terminals 106, databases 108, and a network 110.

The image acquisition device(s) 102 may be and/or include any suitable device that is capable of acquiring image data, such as a camera, a video recorder, a scanner, a mobile telephone, a tablet computing device, a wearable computing device, an infrared imaging device (e.g., a thermal imaging device), and/or any other suitable device that can acquire image data. In some embodiments, the image acquisition device(s) 102 may include a monocular camera, a binocular camera, etc. In some embodiments, the camera may be a visible light camera or a thermal imaging camera. The image acquisition device(s) 102 may include a charge-coupled device (CCD), a complementary metal-oxide-semiconductor (CMOS) sensor, an N-type metal-oxide-semiconductor (NMOS), a contact image sensor (CIS), and/or any other suitable image sensor.

As referred to herein, image data may include any data about one or more images, such as one or more pixel values (e.g., gray values, intensities, color components, luminous, etc. of one or more pixels of an image), timing information, location data, etc. For example, timing information may include a date, a time instant, a time period, etc. on which the image data is acquired. For example, the location data may include one or more coordinates related to one or more image acquisition devices that are configured to acquire the image data (e.g., a latitude coordinate, a longitude coordinate, etc. of the image acquisition devices).

As referred to herein, an image may refer to a still image, a moving image (e.g., a video frame), a thermal image (e.g., a thermal still image, a thermal video frame, etc.), and/or any other suitable image. An image can have any suitable size and/or shape. For example, an image can be a frame, a field, or any suitable portion of a frame or a field, such as a slice, a block, a macroblock, a set of macroblocks, a coding tree unit (CTU), a coding tree block (CTB), etc.

Processor(s) 104 may process image data provided by the image acquisition device 102. In some embodiments, processor 104 may process the image data based on gray value, brightness, texture, or the like, or a combination thereof. In some embodiments, processor 104 may process the image data through background modeling, foreground accumulation, thresholding method, or the like, or a combination thereof. In some embodiments, processor 104 may transmit processed data to the terminal 106, the database 108, and any other device through the network 110. In some embodiments, processor 104 may include one or more processors, one or more processing cores, one or more memories, and one or more electronics for image processing, or the like, or any combination thereof. Merely by way of example, processor 104 may be a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The terminal 106 may input or receive data to and/or from a user, the network 110, the database 108, processor 104, the image acquisition device 102, or the like, or any combination thereof. In some embodiments, the terminal 106 may display and store processed data from processor 104. In some embodiments, the terminal 130 may include a user input, a controller, a processor, etc. For example, the user input may be a keyboard input, a mouse input, a touch screen input, a handwritten input, an image input, a voice input, an electromagnetic wave input, or the like, or any combination thereof. The controller may be configured to control the image acquisition device 101, processor 104, or the database 108. In some embodiments, processor 104 and the terminal 106 may be integrated into one device. Merely by way of example, the terminal 106 may be a computer, a laptop, a Personal Digital Assistant (PDA), a mobile phone, a tablet computer, a portable device, an unmanned aerial vehicle (UAV) or the like, or any combination thereof.

The database 108 may store data relating to system 100. In some embodiments, the data may include image data, environmental data, historical data, etc. The environmental data may include temperature, humidity, wind velocity, wind intensity, wind direction, environmental brightness, ambient light, and the like. The historical data may include historical environmental data, historical fire information, historical skyline segmentation data, etc. Merely by way of example, the database 108 may include a memory. The memory may be a main memory or an assistant memory. The memory may include a Random Access Memory (RAM), a Read-Only Memory (ROM), a Complementary Metal Oxide Semiconductor Memory (CMOS), a magnetic surface memory, a Hard Disk Drive (HDD), a floppy disk, a magnetic tape, a disc (CD-ROM, DVD-ROM, etc.), a USB Flash Drive (UFD), or the like, or any combination thereof. Access to the database 108 may be controlled or gated. At user may need an access privilege to access the database 108. Different users may have different access privileges to different data stored in the database 108. For instance, a first user may only read a portion of the data stored in the database 108. A second user may read and revise a portion of the data stored in the database 108. A third user may read all data stored in the database 108. A fourth user may read and revise all data stored in the database 108. A fifth user has no access privilege and therefore is unable to read or revise any data stored in the database 108. Merely by way of example, the database 108 may be implemented on a cloud platform. The cloud platform may be a cloud computing platform or a cloud storing platform. The type of the cloud platform may include a private cloud, a public cloud, a hybrid cloud, a community cloud, a distributed cloud, an inter-cloud, a multi-cloud, or the like, or any combination thereof.

The network 110 may connect one or more components of the multi camera system 100 with each other, or with an external device (e.g., an external storage device, an external information source, a UAV, or the like, or a combination thereof). The network 110 may be a single network or a combination of different networks. Merely by way of example, the network 110 may be a tele communications network, a Local Area Network (LAN), a Wireless Local Area Network (WLAN), a Metropolitan Area Network (MAN), a Wide Area Network (WAN), a Bluetooth, a ZigBee, a Near Field Communication (NFC), a public network, a private network, a proprietary network, a Public Telephone Switched Network (PSTN), the Internet, a wireless network, a virtual network, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. For example, the multi-camera system 100 may include several image acquisition devices. As another example, processor 104 may be integrated into the image acquisition device 102. However, those variations and modifications do not depart from the scope of the present disclosure.

Figure 2:
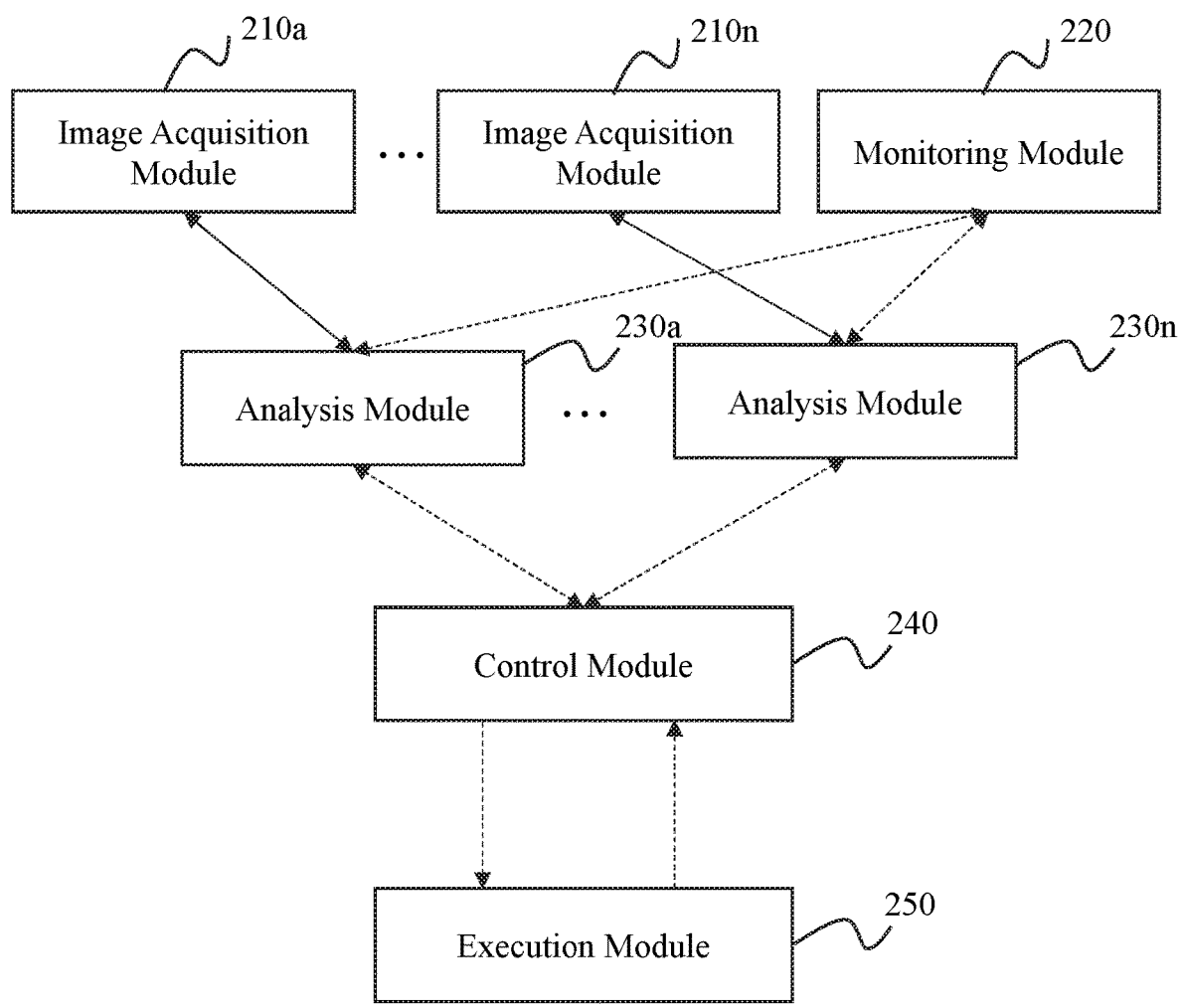
FIG. 2 is a block diagram illustrating an example of a fire detection system in accordance with some embodiments of the disclosed subject matter.

FIG. 2 is a block diagram illustrating an example 200 of a fire detection system in accordance with some embodiments of the disclosed subject matter. As illustrated in FIG. 2, the fire detection system 200 may include one or more image acquisition modules 210a, . . . , 210n, a monitoring module 220, one or more analysis modules 230a, . . . , 230n, a control module 240, and an execution module 250. In some embodiments, system 200 can include multiple image acquisition modules and execution modules. In some embodiments, each of the image acquisition modules 210 may correspond to an analysis module 230. More or less components may be included in system 200 without loss of generality. For example, two of the modules may be combined into a single module, or one of the modules may be divided into two or more modules. In one implementation, one or more of the modules may reside on different computing devices (e.g., different server computers). In some embodiments, system 200 may be implemented using one or more processors, image acquisition devices, databases, and/or any other device described in connection with FIG. 1.

The image acquisition module 210 may acquire image data. The image data may be visible image data (e.g., one or more still images, moving images, etc.), infrared image data (e.g., thermal image data), etc. The image data may include one or more frames, such as one or more video frames, a sequence of images, etc. In some embodiments, the image acquisition module 210 may include one or more support equipments and one or more image acquisition devices (e.g., an image acquisition device 102 of FIG. 1). The support equipment may be configured to support the image acquisition device. In some embodiments, the support equipment may be a cradle head, a tripod, etc. The camera may acquire image data of a monitored area on a cruise. The cruise used herein may be a movement trail of the camera. The cruise may include one or more presets. The preset may be determined by preset information. The preset information may be preset before the cruise, or set dynamically in the cruise according to the analysis information of the analysis module 230. In some embodiments, the preset information may include a horizontal angle of the cradle head, a vertical angle of the cradle head, a focal length of the camera, positional information of the camera (e.g., latitude and longitude coordinates of the camera), a residence time, or a combination thereof. The residence time used herein may refer to a time period for which a camera may stay on a preset. In some embodiments, one or more presets may correspond to a monitored area. The image data may be transmitted to the analysis module 230.

The monitoring module 220 may acquire environmental data. The environmental data may include temperature, humidity, wind velocity, wind intensity, wind direction, environmental brightness, and the like. In some embodiments, the environmental data may be transmitted to the analysis module 230. In some embodiments, the environmental data may be stored in memory. In some embodiments, the monitoring module 220 may acquire environmental data in real time or periodically. In some embodiments, the monitoring module 220 may be a transducer. In some embodiments, the monitoring module 220 may include one or more monitoring modules as described in conjunction with FIG. 4 below.

The analysis module 230 may analyze, process, etc. data for fire detection. In some embodiments, the analysis module 230 may detect a fire according to image data and environmental data. The image data may be acquired by the image acquisition module 210. The environmental data may be provided by the monitoring module 220 or a storage device (e.g., a memory storing historical environmental data). The environmental data may include data acquired in a real-time manner, stored data (e.g., historical environmental data), etc. In some embodiments, the analysis module 230 may identify one or more portions of the image data corresponding to an area for fire detection. For example, the one or more portions of the image data may be identified by performing skyline detection based on the image data. In some embodiments, the analysis module 230 may determine whether a smoke detection or a flame detection is to be performed. For example, the determination may be made based on day and night detection. In some embodiments, the analysis module 230 may execute a smoke detection based on image processing. In some embodiments, the analysis module 230 may execute a flame detection based on image processing.

In some embodiments, the analysis module 230 may generate and/or output a notification. The notification may include an alarm that warns people of a fire incident. In some embodiments, the alarm may be presented via voice, a message, a picture, a video, etc. The notification may be a warning signal. In some embodiments, the warning signal may include preset information, a distance between a camera and a fire incident, or a combination thereof. In some embodiments, the distance between a camera and a fire incident may be obtained through a distance transducer or calculation using the focal length of the image acquisition module 210. The notification may be transmitted to the control module 240, the execution module 250, a terminal, any other device, or a combination thereof. In some embodiments, the terminal may be a computer, a cellphone, a watch, a UAV, or the like, or a combination thereof. In some embodiments, the analysis module 230 may include one or more components described in connection with FIG. 5.

The control module 240 may process a notification. The notification may be acquired from the analysis module 230. The notification may include preset information, a distance between a camera and a fire incident, or a combination thereof. In some embodiments, the control module 240 may calculate a location of a fire incident based on the notification processing. For example, the control module 240 may calculate the location of the fire incident using Geographic Information System (GIS) or Global Positioning System (GPS). In some embodiments, the location of the fire incident may be transmitted to the execution module 250, a terminal, or a combination thereof. The terminal may be a computer, a cellphone, a watch, or the like, or a combination thereof. In some embodiments, fire personnel may confirm whether a fire occurs through the terminal or the control module 240 based on the location of the fire incident, the notification and the image data, etc. If a fire occurs, the control module 240 may cause one or more operations to be performed. In some embodiments, the operations may be determining a fire class. The fire class may be determined according to information about a fire. The information about a fire may be fire conditions, a prediction of future fire behavior, or a combination thereof. The fire conditions may include a fire cause, a fire area, a fire spread direction, and a fire spread speed, etc. In some embodiments, the fire conditions may be obtained through environmental data and image data. The environmental data may be acquired from the monitoring module 230. The image data may be acquired from the image acquisition module 210 or the execution module 250. In some embodiments, a prediction of future fire behavior may be obtained through calculation according to environmental data, fire conditions, vegetation types, fire history information, or a combination thereof. In some embodiments, the operations may be starting a fire suppression process. The fire suppression process may be determined according to the fire class. The fire suppression process may be conducted by the execution module 250.

The execution module 250 may conduct a fire suppression process. The fire suppression process may include generating a guiding signal, evacuating people and material, locating fire suppression equipment, starting automatic fire extinguishing system, or a combination thereof. The guiding signal may be an alarm that warns people of a fire. In some embodiments, the alarm may be a voice, a message, a picture, or a video. The guiding signal may be guiding data, including information about a fire, escape route, or a combination thereof. The guiding signal may be transmitted to fire personnel, a fire department, or people. The automatic fire extinguishing system may include sending fire suppression material to a fire incident automatically. In some embodiments, the execution module 250 may include a UAV. In some embodiments, the UAV may acquire image data related to a fire and transmit the image data to the control module 240. In some embodiments, the UAV may send fire suppression material to a fire.

The data transmission between different modules in the fire detection system may be through a wireless connection, for example, the environmental data transmission between the monitoring module 220 and the analysis module 230, the notification transmission between the analysis module 230 and the control module 240, the information about a fire transmission between the control module 240 and the execution module 250, the guiding signal transmission between execution module 250 and people. In some embodiments, the wireless connection may be wireless bridge or microwave transmission.

It should be noted that the above description is merely provided for the purposes of illustration, and not intended to limit the scope of the present disclosure. For persons having ordinary skills in the art, multiple variations and modifications may be made under the teachings of the present disclosure. For example, the fire detection system 110 may further include a communication module configured to connect different modules in the fire detection system 110 or other devices. As another example, the fire detection system 110 may further include a storage module that may store preset information, image data, environmental data, signals, and information about a fire, etc. As another example, the fire detection system 110 may further include a display module configured to display image data. As another example, the fire detection system 110 may have several monitoring modules, and one monitoring module may correspond to one analysis module. However, those variations and modifications do not depart from the scope of the present disclosure.

Figure 3:
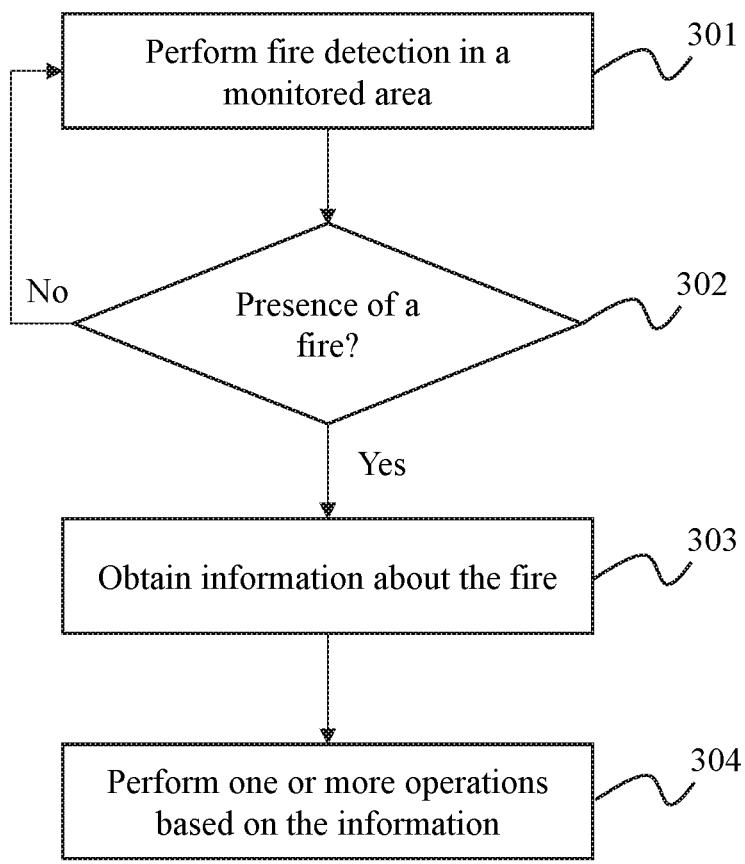
FIG. 3 is a flowchart illustrating an example of a process for fire detection in accordance with some embodiments of the disclosed subject matter.

FIG. 3 is a flowchart illustrating an example 300 of a process for fire detection in accordance with some embodiments of the disclosed subject matter.

In 301, process 300 may perform fire detection in a monitored area. In some embodiments, the fire detection may be performed according to image data and environmental data. The image data may include one or more frames, such as one or more video frames, a sequence of images, etc. In some embodiments, the image data may be image data or thermal infrared image data. In some embodiments, the image data may be color image data or gray image data. The environmental data may include temperature, humidity, wind velocity, wind intensity, wind direction, environmental brightness, and the like. In some embodiments, the fire detection may be based on image processing. The image processing may include skyline segmentation, day and night detection, smoke detection, flame detection and generate a notification. In 302, process 300 may determine whether there is a presence of a fire. In response to determining there is no presence of a fire, process 300 may proceed to 301 and continue to perform fire detection in a monitored area. In response to determining there is a presence of a fire, process 300 may proceed to 303 and obtain information about the fire.

In 303, process 300 may obtain information about the fire. The information about a fire may be a location of the fire incident, fire conditions, a prediction of future fire behavior, or a combination thereof. The fire conditions may include a location of the fire incident, a fire cause, a fire area, a fire spread direction, and a fire spread speed. In some embodiments, the location of the fire incident may be calculated according to preset information, a distance between a camera and a fire incident, or a combination thereof. In some embodiments, the location of the fire incident may be determined by a UAV. In some embodiments, the location of the fire incident may be determined using GIS or GPS. In some embodiments, the fire conditions may be obtained through environmental data and image data. In some embodiments, a prediction of future fire behavior may be obtained through calculation according to environmental data, fire conditions, vegetation types, fire history information, or a combination thereof.

In 304, process 300 may perform one or more operations based on the information. In some embodiments, the operations may be determining a fire class, starting a fire suppression process, or a combination thereof. The fire suppression process may include generating a guiding signal, evacuating people and material, locating fire suppression equipment, or starting automatic fire extinguishing system.

It should be noted that the above description is merely provided for the purposes of illustration, and not intended to limit the scope of the present disclosure. For persons having ordinary skills in the art, multiple variations and modifications may be made under the teachings of the present disclosure. For example, 303 and 304 may be performed simultaneously or sequentially. As another example, 303 and 304 may be combined and the operations taken in 304 may include obtaining information about a fire. However, those variations and modifications do not depart from the scope of the present disclosure.

Figure 4:
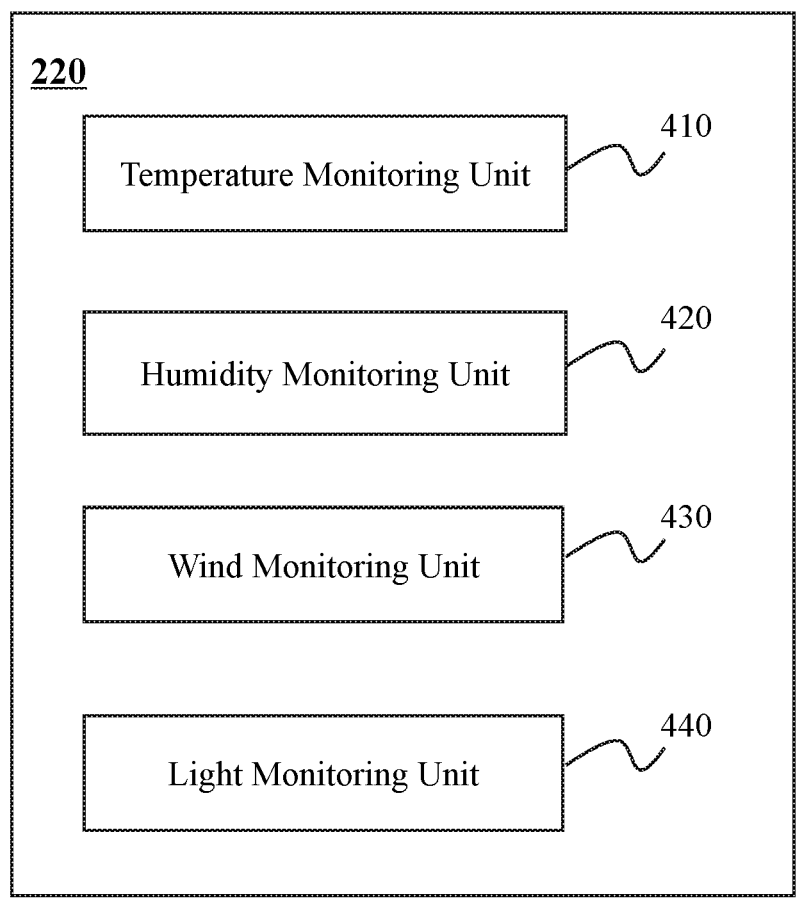
FIG. 4 is a block diagram illustrating an example of a monitoring module in accordance with some embodiments of the disclosed subject matter.

FIG. 4 is a block diagram illustrating an example of a monitoring module in accordance with some embodiments of the disclosed subject matter. As illustrated in FIG. 4, the monitoring module 220 may include a temperature monitoring unit 410, a humidity monitoring unit 420, a wind monitoring unit 430, a light monitoring unit 440, and/or any other device that can monitor environmental data. More or less components may be included in the monitoring module without loss of generality. For example, two of the modules may be combined into a single module, or one of the modules may be divided into two or more modules. In one implementation, one or more of the modules may reside on different computing devices (e.g., different server computers). In some embodiments, the monitoring module of FIG. 4 may be the same as the monitoring module of FIG. 2.

The temperature monitoring unit 410 may detect a temperature. In some embodiments, the temperature monitoring unit 410 may include a temperature transducer, a thermometer, and/or any other device that can measure temperature, temperature gradients, and/or any other information about temperature. In some embodiments, the temperature monitoring unit 410 may detect a temperature in a monitored area, such as a temperature in a forest.

The humidity monitoring unit 420 may detect humidity data. In some embodiments, the humidity monitoring unit 420 may include a humidity transducer, a psychrometer, and/or any other device that can measure humidity, humidity gradients, and/or any other information about humidity. In some embodiments, the humidity monitoring unit 420 may detect a humidity in a monitored area, such as humidity data in a forest.

The wind monitoring unit 430 may detect a wind intensity, a wind direction, and/or any other wind data. In some embodiments, the wind monitoring unit 430 may be a wind transducer, a wind direction sensor, a wind speed sensor, and/or any other device that can measure wind velocity, wind speed, wind direction, wind intensity and/or any other information about wind. In some embodiments, the wind monitoring unit 430 may detect information about a wind in a monitored area, such as a wind in a forest.

The light monitoring unit 440 may detect information about ambient light, such as brightness of an environment in which the light monitoring unit is positioned (e.g., also referred to as the "environmental brightness"). In some embodiments, the light monitoring unit 440 may be a light transducer and/or any other device that can measure brightness intensity, and/or any other information about brightness. In some embodiments, the light monitoring unit 440 may detect information about brightness (e.g., environmental brightness) in a monitored area, such as brightness in a forest.

Figure 5:
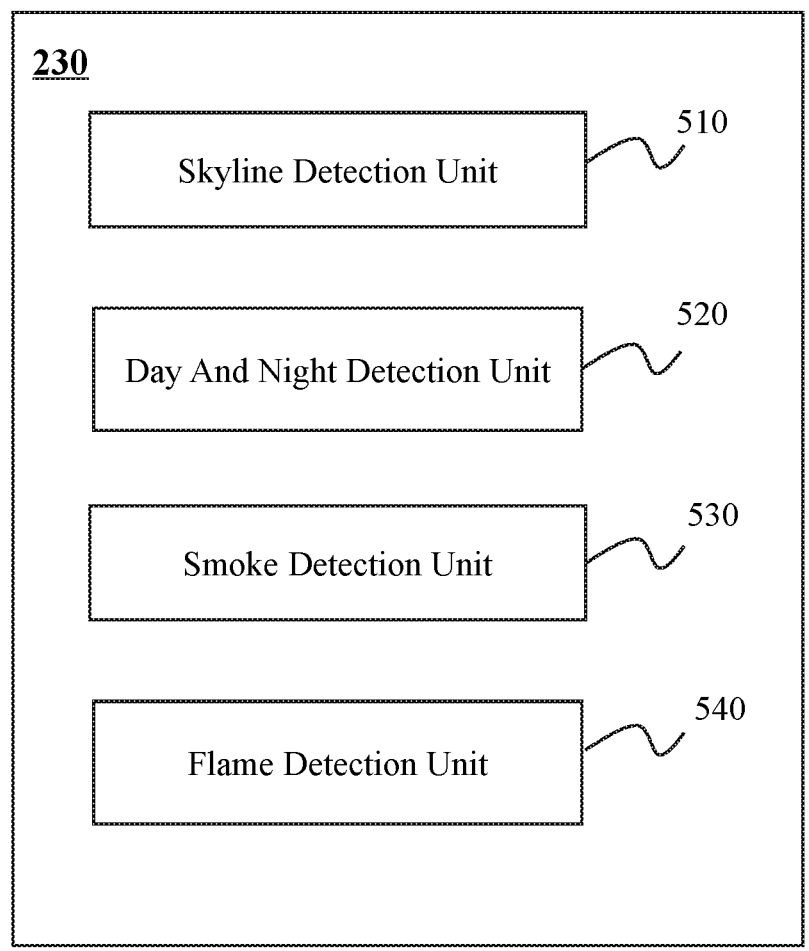
FIG. 5 is a block diagram illustrating an example of an analysis module in accordance with some embodiments of the disclosed subject matter.

FIG. 5 is a block diagram illustrating an example of an analysis module in accordance with some embodiments of the disclosed subject matter. As illustrated in FIG. 5, the monitoring module 230 may include a skyline detection unit 510, a day and night detection unit 520, a smoke detection unit 530, and a flame detection unit 540. More or less components may be included in the analysis module without loss of generality. For example, two of the modules may be combined into a single module, or one of the modules may be divided into two or more modules. In one implementations, one or more of the modules may reside on different computing devices (e.g., different server computers). In some embodiments, the analysis module of FIG. 5 may be the same as the analysis module of FIG. 2.

The skyline detection unit 510 may perform skyline detection on image data (e.g., image data acquired by the image acquisition module 210 or any other device). For example, the skyline detection unit 510 can identify one or more portions of the image data corresponding to an area for fire detection (e.g., a forest, etc.), a sky, a skyline, etc. More particularly, for example, the skyline may be detected by segmenting one or more images into regions divided by the skyline, such as one or more regions corresponding to a sky, one or more regions corresponding to an area for fire detection (e.g., a forest, etc.). In some embodiments, the skyline may be detected using a thresholding method, one or more clustering methods, compression-based methods, histogram-based methods, edge detection, region-growing methods, Chan-Vese model, any other method for image segmentation and/or processing, or a combination thereof. For example, the region-growing methods is a iterated process of examining neighboring pixels of initial seed points and determining whether the pixel neighbors should be added to a region. As another example, the Chan-Vese model is conducted based on a simplified Mumford-Shah functional for segmentation. In some embodiments, the skyline segmentation may be direct or indirect. The direct skyline segmentation may be conducted based on an image characteristic, and the indirect skyline segmentation may be conducted based on a skyline segmentation history. In some embodiments, the image characteristic may be color information, luminance, gray values, texture, or any other feature of one or more pixels. In some embodiments, the skyline segmentation history may be previous skyline segmentation corresponding to image data with the same preset. One or more segmentation images with a skyline may be obtained based on the skyline segmentation. The skyline may divide each segmentation image into two regions. In some embodiments, the skyline detection unit 510 may process the one or more segmentation images based on morphological image processing. The morphological image processing may be dilation, erosion, or a combination thereof. In some embodiments, the skyline detection unit 510 may determine whether the skyline satisfies a skyline segmentation feature in the segmentation image. The skyline segmentation feature may relate to luminance, gray values, texture, and/or any other feature of one or more pixels. In response to determining that the skyline satisfies the skyline segmentation feature, one region of the segmentation image may be designated as a fire detection region. In response to determining that the skyline does not satisfy the skyline segmentation feature, the entire segmentation image may be designated as a fire detection region. Merely by way of example, a fire detection region may be a region with a lower gray value than the other region.

The day and night detection unit 520 may perform day and night detection and may determine whether a "day" mode or a "night" mode is to be executed for fire detection. For example, the day and night detection may be performed by determining whether a time of day is in the day or at night. The time of day may be a time instant or a time period. In some embodiments, the day and night detection unit 520 can determine a time as being in the day (e.g., corresponding to daytime) in response to determining that the time falls within a time interval corresponding to daytime (e.g., 8:00 am-7:00 pm, 7:00 am-8:00 pm, etc.). The day and night detection unit 520 can determine a time as being at night in response to determining that the time falls within a time interval corresponding to nighttime (e.g., 6:00 pm-8:00 am, 7:00 pm-7:00 am, etc.). In some embodiments, one or more time intervals may correspond to the daytime and/or the night time. In some embodiments, the time intervals may be determined based on sunrise time and/or sunset time. In some embodiments, the time intervals may be determined based on one or more user inputs, image data related to a monitored area, etc.

As another example, the day and night detection may be performed based on image processing. The image processing may be based on gray values of image data acquired at a time of day. As an example, the day and night detection unit 520 may divide an image into one or more blocks and calculate an average gray value of each block. The day and night detection unit 520 may compare the average gray value of each block with a first threshold and calculate the number of blocks with an average gray value greater than the first threshold. In some embodiments, the first threshold may be in a range from 65 to 90 (e.g., 70, 75, 80, 85, 90, etc.). The day and night detection unit 520 may calculate a percentage of the blocks with an average gray value greater than the first threshold in the total blocks, and compare the percentage with a second threshold. If the percentage is not less than the second threshold, the time of day is in the day.

If the percentage is less than the second threshold, the time of day is at night. In some embodiments, the second threshold may be in a range from 0.45 to 0.55, for example, 0.5. In some embodiments, the day and night detection may be performed based on equations (1), (2), and/or (3):

$$F(\overline{Y}_{block}, thr1) = \begin{cases} 1 & \text{if } (Y_{block} \geq thr1) \\ 0 & \text{otherwise} \end{cases}, \quad (1)$$

$$n = \sum_{i=1}^{N} F(\overline{Y}_{block}, thr1), \quad (2)$$

$$L = \begin{cases} 1 & \text{if } (n/N \geq thr2) \\ 0 & \text{otherwise} \end{cases}, \quad (3)$$

wherein, $\overline{Y}_{block}$ may denote an average gray value in a block; thr1 may denote a first threshold; N may denote the total number of blocks in an image; n may denote the number of blocks with an average gray value greater than thr1; L=1 may denote that a time of day is in the day, and L=0 may denote a time of day is at night.

As a further example, the day and night detection unit 520 may determine whether a time of day is in the day or at night based on environmental brightness. The environmental brightness may be acquired from the light monitoring unit 440. In some embodiments, the day and night detection unit 520 may detect a time of day is during the day or at night for each image or an image acquired in a time period. For example, the time period may be from half an hour before sunrise to the sunrise time, from half an hour before sunset to the sunset time, or any other suitable time period. The sunrise time and the sunset time may be obtained according to image data, for example, the image date and the image location.

The smoke detection unit 530 may conduct smoke detection. In some embodiments, the smoke detection unit 530 may conduct a smoke detection based on image data and environmental data. In some embodiments, the smoke detection unit 530 may determine one or more pixels that may correspond to the presence of smoke in a monitored area (e.g., also referred to as the "candidate smoke pixels"). The candidate smoke pixels may be pixels that may correspond to presence of smoke. In some embodiments, the candidate smoke pixels may be determined based on a foreground image. In some embodiments, the foreground image may be acquired through frame differencing, background subtraction, optical flow methods, etc. In some embodiments, the foreground image may be acquired by generating a difference image between a fast background image and a slow background image. In some embodiments, the smoke detection unit 530 may identify a candidate smoke region. The candidate smoke region may include one or more image regions including the candidate smoke pixels. In some embodiments, the candidate smoke region may be identified based on foreground accumulation, morphological image processing, connected component labeling, or the like, or a combination thereof. In some embodiments, the smoke detection unit 530 may conduct color analysis on the candidate smoke region. In some embodiments, the smoke detection unit 530 may determine a potential smoke region. The potential smoke region may include one or more image regions that are likely to correspond to presence of smoke. In some embodiments, the potential smoke region may be determined based on energy analysis and smoke diffusion analysis. In some embodiments, the smoke detection unit 530 may process image data related to the potential smoke region using a classifier (e.g., Decision Tree, Bayesian Classifier, Artificial Neural Networks (ANN), k-Nearest Neighbors (KNN), Mining in database (MIND), etc.). In some embodiments, the smoke detection may be conducted by performing one or more operations described in connection with FIGS. 7A and 7B below.

The flame detection unit 540 may conduct flame detection. In some embodiments, the flame detection unit 540 may conduct a flame detection based on image data and/or environmental data. The image data may include one or more frames, such as one or more video frames, a sequence of images, etc. In some embodiments, the flame detection unit 540 may determine a candidate flame region. The candidate flame region may include one or more image regions that may correspond to presence of a flame. In some embodiments, the candidate flame region may be determined based on a highlight background image, a foreground image, etc. In some embodiments, the flame detection unit 540 may determine a flicker foreground image. In some embodiments, the flicker foreground image may be determined based on a highlight edge region and a foreground accumulation image. In some embodiments, the flame detection unit 540 may process image data related to the flicker foreground image using a classifier that can classify image data into one or more classes (e.g., a class corresponding to presence of smoke, a class corresponding to absence of smoke, etc.). In some embodiments, the flame detection may be conducted by performing one or more operations described in connection with FIGS. 8A and 8B below.

It should be noted that the above description is merely provided for the purposes of illustration, and not intended to limit the scope of the present disclosure. For persons having ordinary skills in the art, multiple variations and modifications may be made under the teachings of the present disclosure. For example, the analysis module 230 may further include a storage unit that may store skyline segmentation history, image data, environmental data, etc. However, those variations and modifications do not depart from the scope of the present disclosure.

Figure 6:
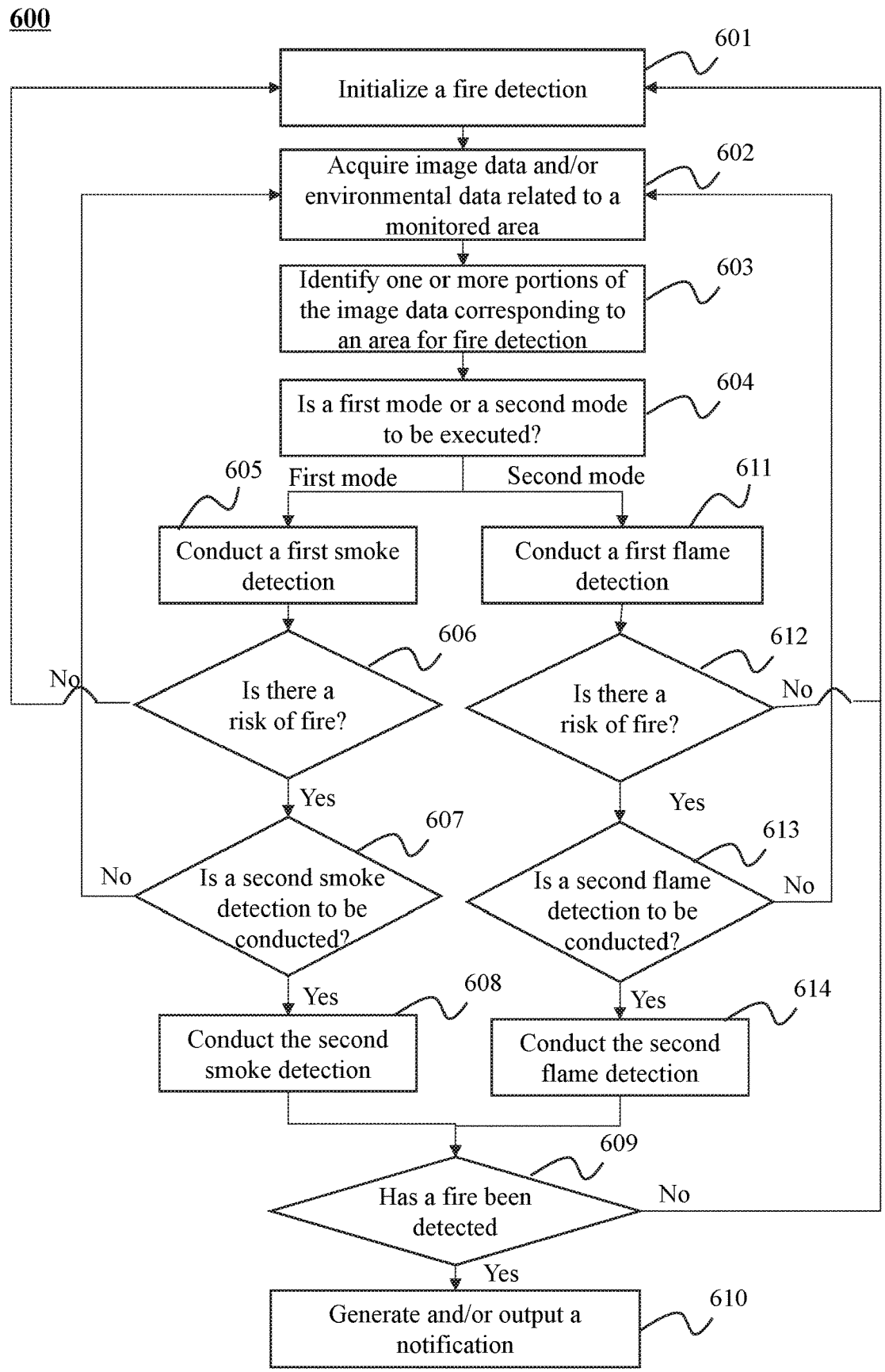
FIG. 6 is a flow diagram illustrating an example of a process for fire detection in accordance with some embodiments of the disclosed subject matter.

FIG. 6 is a flow diagram illustrating an example 600 of a process for fire detection in accordance with some embodiments of the disclosed subject matter. Process 600 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 600 can be implemented by one or more components of system 100.

In 601, process 600 may initialize a fire detection. For example, process 600 can configure one or more image acquisition devices (e.g., cameras) for fire detection. The configuration may be made by adjusting a field of view, panning, tilting, zooming, etc. of the image acquisition device(s). The configuration may be made via a movement trail of a camera configured on a cradle head. In some embodiments, the initialization may be performed based on preset information related to the image acquisition devices and/or any other device that can be used for fire detection. The preset information may include, for example, a horizontal angle of the cradle head, a vertical angle of the cradle head, a focal length of the camera, latitude and longitude coordinates of the camera, a residence time, or a combination thereof. The preset information may be determined based on conditions of a region of interest. In some embodiments, the conditions of the region of interest may include a distance between an image acquisition device and the region of interest, a height of the region of interest, an area of the region of interest, etc. For example, the horizontal angle of the cradle head may be set according to the height of the region of interest.

In 602, process 600 may acquire image data and/or environmental data related to a monitored area. The image data may include one or more images about the monitored area, such as one or more still images, moving images (e.g., video frames), etc. The environmental data may include temperature data (e.g., one or more temperatures of one or more portions of the monitored area), humidity data, wind data (e.g., wind velocities, wind speeds, wind intensities, wind directions, etc.), environmental brightness, the like, or any combination thereof. In some embodiments, the image data and/or the environmental data may be obtained in real time. Alternatively or additionally, the image data and/or the environmental data may include historical data related to the monitored area. The monitored area may be an area monitored by one or more image acquisition devices (e.g., one or more cameras, thermal imaging devices, etc.).

In 603, process 600 may identify one or more portions of the image data corresponding to an area for fire detection. The area for fire detection can be and/or include a forest, grasslands, public places, and/or any other area that is subject to fire detection. The portion(s) of the image data may include, for example, one or more image regions corresponding to one or more images. As used herein, an image region may refer to one or more portions of an image. The portions of the image may or may not be adjacent. The image region may have any suitable size (e.g., including any number of pixels). In some embodiments, the one or more portions of image data may be identified by performing skyline detection. For example, process 600 can detect one or more pixels of an image corresponding to a skyline. Process 600 can also segment the image into one or more regions corresponding to the area for fire detection, one or more regions corresponding to a sky, etc. In some embodiments, the skyline detection may be performed by skyline detection unit 510 as described in connection with FIG. 5.

In 604, process 600 may determine whether a first mode or a second mode is to be executed. In some embodiments, the first mode may be executed by performing one or more smoke detections. The second mode may be executed by performing one or more flame detections. In some embodiments, the first mode and the second mode may correspond to a "day" mode and a "night" mode, respectively. Process 600 may determine whether to execute the first mode or the second mode according to day and night detection. For example, process 600 can perform a day and night detection to determine whether the image data and/or the environmental data corresponds to daytime or nighttime. Process 600 can then determine that the first mode is to be executed in response to determining that the image data and/or the environmental data corresponds to daytime. Alternatively, process 600 can determine that the second mode is to be executed in response to determining that the image data and/or environmental data corresponds to nighttime.

The day and night detection may be performed in any suitable manner. For example, the day and night detection may be performed based on timing information related to the image data (e.g., a time at which the image data is acquired by an image acquisition device). As another example, the day and night detection may be performed based on gray values of the image data acquired at the time. As still another example, the day and night detection may be performed based on environmental brightness. In some embodiments, the day and night detection may be performed by executing one or more operations as described in connection with the day and night detection unit 520 of FIG. 5.

In some embodiments, in response to determining that the first mode is to be executed (e.g., "YES" at 604), process 600 may proceed to 605 and may conduct a first smoke detection. In some embodiments, the first smoke detection may be conducted based on the image data and/or the environmental data acquired at 602. For example, process 600 can determine a temperature difference in the monitored area based on the image data (e.g., thermal image data acquired by one or more thermal imaging devices). The temperature difference may be a temperature difference between different portions in a monitored area. Process 600 may compare the temperature difference with a threshold and may determine whether the temperature difference is greater than the threshold.

As another example, process 600 can process the image data to determine whether one or more portions of the image data indicate the presence of smoke in the monitored area. In a more particular example, process 600 can perform background subtraction and/or foreground detection to detect one or more pixels and/or image regions corresponding to the presence of smoke. In another more particular example, process 600 can process one or more portions of the image data using a color model. In some embodiments, the first smoke detection may be conducted by performing one or more operations as described in connection with FIG. 7A below.

In 606, process 600 may determine whether there is a risk of fire. This determination may be made based on information related to the first smoke detection. For example, process 600 can determine that there is a risk of fire in response to determining that the temperature difference in the monitored area is greater than the threshold. As another example, process 600 can determine that there is a risk of fire in response to detecting the presence of smoke based on the image data and/or the environmental data.

In some embodiments, in response to determining that there is no risk of a fire, process 600 may proceed to 601 and may initialize another fire detection.

In response to detecting a risk of fire, process 600 may proceed to 607 and may determine whether a second smoke detection is to be conducted. For example, process 600 can detect one or more pixels in an image that have been changed in a time period and one or more regions including the pixels (also referred to as "motion regions"). In some embodiments, a pixel may be regarded as having been changed when a difference between a pixel value of the pixel in a first image (e.g., a current image) and a pixel value of the pixel in a second image (e.g., a previous image) exceeds a predetermined threshold. Process 600 may then compare the size of the motion region(s) with a threshold and make the determination based on the comparison. More particularly, for example, process 600 may determine that a second smoke detection is to be conducted in response to determining that the size of the motion region(s) is greater than the threshold. Alternatively, process 600 can determine that a second smoke detection is not to be conducted in response to determining that the size of the motion region(s) is not greater than the threshold. In some embodiments, the size of the motion region(s) may be measured by the number of pixels in the motion region(s), a ratio of the motion region(s) to the number of regions in the image, a percentage of the motion region(s) in the image, and/or any other parameter that can measure the size of the motion region(s). In a more particular example, process 600 may compare a percentage of the motion region with a threshold. The percentage of the motion region may be a proportion of the size of the motion region(s) in an image including the motion region(s). The motion region may be a region in which pixels change in a time period. In some embodiments, the motion region may be part or whole of a candidate smoke region. In some embodiments, the threshold may be in a range from 0.08% to 0.11% (e.g., 0.1%) or any other suitable value.

In some embodiments, in response to determining that a second smoke detection is not to be conducted ("NO" at 607), process 600 may proceed to 602 and may configure the image acquisition device(s) and acquire new image data related to the monitored area. For example, process 600 can adjust the preset information by changing one or more of a horizontal angle of the cradle head, a vertical angle of the cradle head, a focal length of the image acquisition device(s), positional information of the image acquisition device(s) (e.g., latitude and longitude coordinates of the image acquisition device(s)), an orientation of the image acquisition device(s), a field of view of the image acquisition device(s), etc. In some embodiments, the preset information may be adjusted to place image region(s) corresponding to presence of fire risk in a center of an image in the new image data. For example, process 600 can determine a center of the motion region(s). Process 600 can then cause the center of the motion region(s) to be positioned in a center of one or more images in the new image data by adjusting the preset information. In some embodiments, process 600 can make a motion region percentage within the threshold. In some embodiments, the center of the motion region(s) may be an average center of neighboring motion regions. For example, process 600 may merge the neighboring motion regions and calculate the average center of the neighboring motion regions based on a center of each of the neighboring motion regions.

In some embodiments, in response to determining that a second smoke detection is to be conducted ("YES" at 607), process 600 may proceed to 608 and may conduct the second smoke detection. In some embodiments, the second smoke detection may be conducted based on the image data and/or the environmental data acquired at 607. In some embodiments, process 600 may process the image data to determine whether the image data indicates the presence of smoke in the monitored area. For example, process 600 may perform energy analysis to determine one or more potential smoke blocks. As another example, process 600 may perform smoke diffusion analysis to determine a potential smoke region. In still another example, process 600 can process the image data related to the potential smoke using a classifier that can classify image data into one or more classes (e.g., image data corresponding to the presence of smoke, image data corresponding to the absence of smoke, etc.). In some embodiments, the second smoke detection may be conducted by performing one or more operations as described in connection with FIG. 7B below.

In 609, process 600 may determine whether a fire has been detected. In some embodiments, in response to determining that a fire has not been detected, process 600 may proceed to 601 and may initialize another fire detection.

Alternatively, in response to detecting a fire, process 600 may proceed to 610 and may generate and/or output a notification. In some embodiments, the notification may include any suitable content, such as one or more images, video content, audio content, graphics, text, etc. In some embodiments, the notification can include any suitable information, such as a warning about the presence of the fire, the preset information, location information about the fire (e.g., one or more coordinates of the fire, a distance between a camera and the fire, etc.), the like, or a combination thereof. In some embodiments, the notification may be sent via any suitable platform and/or service, such as an email service, a social network, a content hosting platform, a content sharing platform, a mobile platform, etc.

In some embodiments, in response to determining that the second mode is to be executed in 604, process 600 may proceed to 611 and may conduct a first flame detection. In some embodiments, the first flame detection may be conducted based on the image data and/or the environmental data acquired at 602. For example, process 600 can determine a temperature difference in the monitored area based on the image data (e.g., thermal image data acquired by one or more infrared imaging devices). Process 600 may compare the temperature difference with a threshold and may determine whether the temperature difference is greater than the threshold.

As another example, process 600 can process the image data to determine whether one or more portions of the image data indicate the presence of flame in the monitored area. In a more particular example, process 600 can generate a background image and a highlight background image. In still another more particular example, process 600 can acquire a foreground image and conduct morphological image processing. In some embodiments, the first flame detection may be conducted by performing one or more operations as described in connection with FIG. 8A below.

In 612, process 600 may determine whether there is a risk of a fire. This determination may be made based on information related to the first flame detection. For example, process 600 can determine that there is a risk of a fire in response to determining that the temperature difference in the monitored area is greater than the threshold. As another example, process 600 can determine that there is a risk of a fire in response to detecting the presence of flame based on the image data and/or the environmental data.

In some embodiments, in response to determining that there is no risk of fire, process 600 may proceed to 601 and may initialize another fire detection. In response to detecting a risk of a fire, process 600 may proceed to 613 and may determine whether a second flame detection is to be conducted. For example, process 600 may compare the size of a motion region with a threshold. In a more particular example, process 600 may compare the size of a motion region with a threshold. In some embodiments, the motion region may be part or whole of a candidate flame region. In some embodiments, the threshold may be in a range from 0.08% to 0.11%, for example, 0.1%. In some embodiments, in response to determining that the motion region percentage is less than the threshold, process 600 may proceed to 602 and may acquire an image with adjusting the preset information. In some embodiments, the preset information may be adjusted by centering the location of the motion region in an image or acquiring a motion region percentage within the threshold. The location of the motion region may be a center of the motion region. In some embodiments, the center of the motion region may be an average center of neighboring motion regions. In some embodiments, process 600 may merge neighboring motion regions and calculate the average center of neighboring motion regions through each center of each neighboring motion region.

In response to determining that the motion region percentage is not less than the threshold, process 600 may proceed to 614 and may conduct the second flame detection. In some embodiments, the second flame detection may be conducted based on the image data and/or the environmental data acquired at 613. In some embodiments, process 600 may process the image data to determine whether the image data indicate the presence of flame in the monitored area. For example, process 600 may acquire a highlight edge region. As another example, process 600 may perform foreground accumulation. In still another example, process 600 may determine a flicker foreground image. In still another example, process 600 may process the image data related to the flicker foreground image using a classifier that can classify image data into one or more classes (e.g., image data corresponding to the presence of a flame, image data corresponding to the absence of a flame, etc.). In some embodiments, the second flame detection may be conducted by performing one or more operations as described in connection with FIG. 8B. Then process 600 may proceed to 609 and determine whether a fire has been detected. In some embodiments, in response to determining that a fire has not been detected, process 600 may proceed to 601. Alternatively, in response to detecting a fire, process 600 may proceed to 610 and may generate and/or output a notification It should be noted that the above description is merely provided for the purposes of illustration, and not intended to limit the scope of the present disclosure. For persons having ordinary skills in the art, multiple variations and modifications may be made under the teachings of the present disclosure. For example, 603 and 604 may be performed simultaneously or sequentially. As another example, 603 is not necessary and may be omitted. As another example, 604 is not necessary, the first mode detection and second mode detection may be both conducted on the image data. However, those variations and modifications do not depart from the scope of the present disclosure.

Figure 7A:
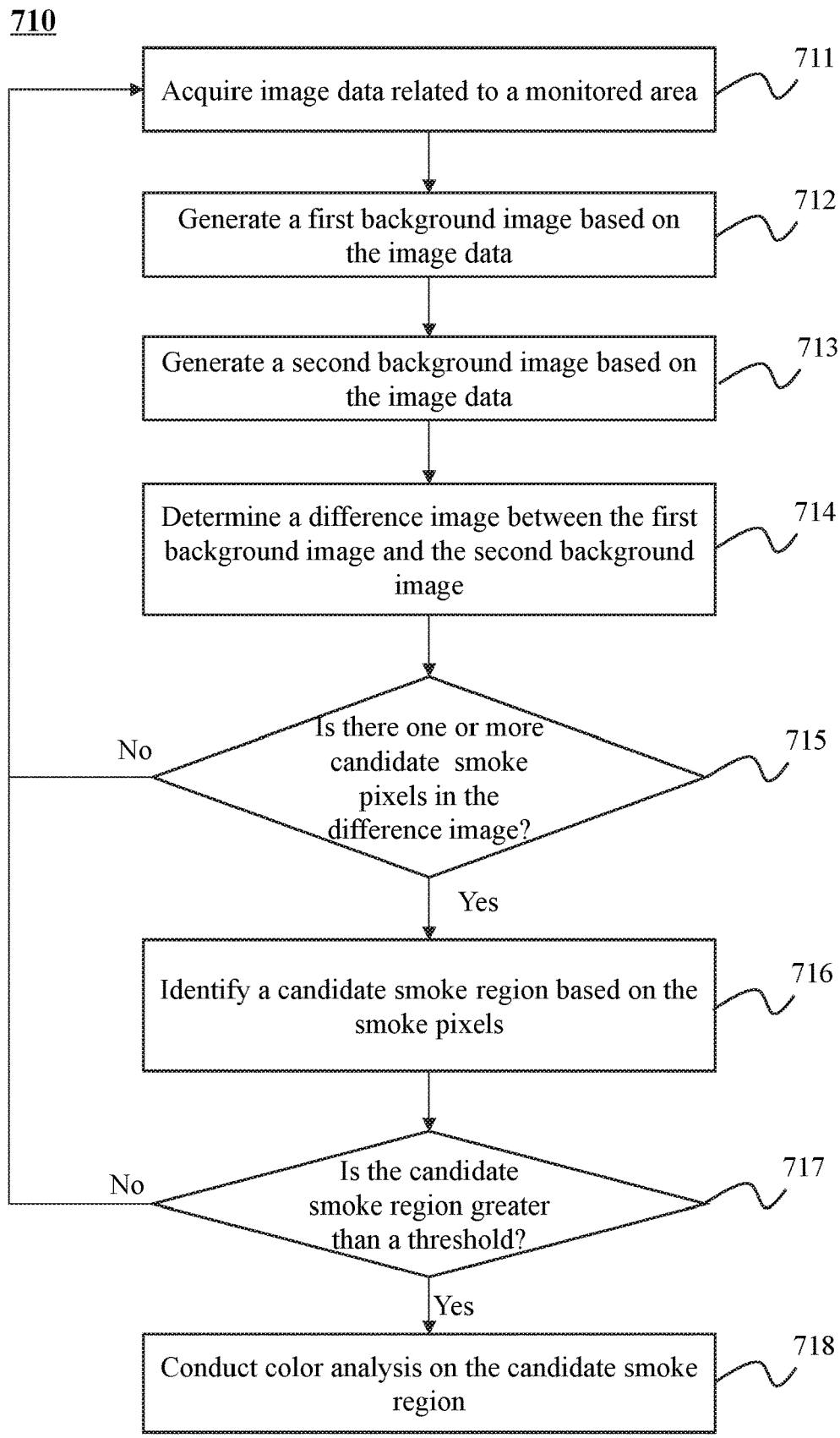
FIG. 7A is a flow diagram illustrating an example of a process for first smoke detection in accordance with some embodiments of the disclosed subject matter.

FIG. 7A is a flow diagram illustrating an example 710 of a process for first smoke detection in accordance with some embodiments of the disclosed subject matter. Process 710 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 710 can be implemented by one or more processors implementing a smoke detection unit 530 of FIG. 5.

In 711, process 710 may acquire image data related to a monitored area. The image data may include one or more frames, such as one or more video frames, a sequence of images, etc. In some embodiments, the image data may be color or gray image data. In some embodiments, the image data related to the monitored area may be one or more portions of the image data acquired in 602 or 603. In some embodiments, the image data related to the monitored area may be obtained using frame skipping techniques. For example, process 710 can extract one or more frames from the image data at a particular rate for processing. More particularly, for example, process 710 can extract a certain number of frames in a given time period (e.g., 2 frames per second, 3 frames per second, 5 frames per second, 10 frames per second, 2 frames every two seconds, etc.). As another example, process 710 can extract particular frames from the image data for processing, such as one or more key frames, I-frames, etc. As such, not all frames of the image data acquired in 602 or 603 have to be processed.

In 712, process 710 may generate a first background image based on the image data. For example, process 710 may initialize a first background image. In a more particular example, process 710 may designate an image in the image data as the first background image. The designated image may be, for example, a first image of a group of images, an image representative of a video scene (e.g., an I-frame, a key frame, etc.), a random image, and/or any other image in the image data. In another more particular example, process 710 may generate the first background image by averaging multiple images (e.g., frames). The multiple images may be averaged, for example, by determining average pixel values of the multiple frames. In still another more particular example, process 710 may generate the first background image by determining a median frame of multiple frames. The median frame used herein may refer to the intermediate frame in the multiple frames.

As another example, process 710 may generate the first background image by updating a previously generated first background image (e.g., an initial first background image, a previously updated first background image, etc.). In some embodiments, process 710 may update the first background image periodically. For example, the first background image may be updated every few frames (e.g., one frame, five frames, ten frames, etc.). As another example, the first background image may be updated every few seconds, every few milliseconds, every few minutes, and/or at any other interval. The first background image may be updated at a rate (e.g., also referred to as the "update rate"). In some embodiments, the first background image may be updated based on a previous background image and a current image. For example, the first background image may be generated based on equation (4) as follows:

$$Bg(p, n+m) = \begin{cases} \alpha * Bg(p, n) + (1-\alpha) * Img(p, n) & \text{if (pixel is not moving)} \\ Bg(p, n) & \text{otherwise} \end{cases} \quad (4)$$

wherein Bg may denote a current background image; Bg(p, n) may denote a pixel value of a pixel p in the current background image (the nth background image); 1 mg may denote a current image; Img(p,n) may denote a pixel value of the pixel p in the current image (e.g., the nth image); α may denote an update rate; m may denote an interval between two adjacent updated background images; Bg (p,n+m) may denote a pixel value of the pixel p in an updated background image; p may denote an index of a pixel in an image (e.g., a current background image, a current image, an updated background image, etc.); n may denote an index of an image. In some embodiments, the value of α may be a number falls within an interval between 0 and 1.

In 713, process 710 may generate a second background image based on the image data. In some embodiments, the image data used in 713 and 712 may or may not be the same. In some embodiments, the method of generating a background image in 713 and 712 may or may not be the same.

The first background image and the second background image may be updated at a first update rate and a second update rate, respectively. The first update rate and the second update rate may or may not be the same. In some embodiments, the first background image may be updated at a lower rate (also referred to herein as "a slow background image"). The second background image may be updated at a higher rate (also referred to as "a fast background image"). In some embodiments, the interval m in the updating of a slow background image may be a positive integer greater than 1, for example 2, 5, 10, etc., and the interval m in the updating of a fast background image may be 1. The update rate in the updating of the slow background image may be greater than the update rate in the updating of the fast background image.

In some embodiments, the update rate may be in a range from 0.6 to 0.8, for example 0.7, etc.

In 714, process 710 may determine a difference image based on the first background image and the second background image. The difference image may represent one or more differences between the first background image and the second background image. For example, the difference image may be generated by comparing pixel values of a pixel in the first background image and a corresponding pixel in the second background image. The difference may include, for example, an absolute difference, a squared difference, a transformed difference (e.g., a difference calculated based on a Hadamard transform), and/or any other measure of similarity between pixels. In some embodiments, a first pixel in a first image may be regarded as corresponding to a second pixel in a second image when the coordinates of the second pixel are the same as the coordinates of the first pixel. In some embodiments, the difference image may be a foreground image representing differences between the first background image and the second background image.

In 715, process 710 may determine whether there is one or more candidate smoke pixels in the difference image. For example, process 710 can compare a pixel value (e.g., a gray value) of a pixel in the difference image with a threshold. In some embodiments, in response to determining that the pixel value is greater than the threshold, process 710 can determine that the pixel is a candidate smoke pixel. Alternatively, process 710 can determine that the pixel is not a candidate smoke pixel in response to determining that the pixel value is not greater than the threshold. The threshold can have any suitable value. For example, the threshold may be in a range from 5 to 10 (e.g., 6, 7, 8, 9, etc.). In some embodiments, the pixels of the difference image may be processed in a raster order, in parallel, in a zig-zag scanning order, in a random order, and/or in any other suitable manner.

In some embodiments, thresholding and/or normalization may be performed to identify one or more candidate smoke pixels. For example, in response to determining that a pixel value of a pixel in the difference image is not greater than or equal to a threshold, process 710 can assign a first value to the pixel (e.g., "255" or any other suitable value). Alternatively, in response to determining that the pixel value is less than the threshold, process 710 can assign a second value to the pixel (e.g., "0" or any other suitable value). The pixel value may represent a difference between pixel values of corresponding pixels in the first background image and the second background image. More particularly, for example, one or more candidate smoke pixels may be identified based on equation (5) as follows:

$$Fg(p, n) = \begin{cases} 255 & |Bg_{fast}(p, n) - Bg_{slow}(p, n)| \geq thr \\ 0 & \text{otherwise} \end{cases} \quad (5)$$

where $Bg_{fast}(p,n)$ may denote a pixel value of a pixel (e.g., pixel p) of a fast background image (e.g., the nth fast background image); $Bg_{slow}(p,n)$ may denote a pixel value of the pixel (e.g., pixel p) in a slow background image (e.g., the nth slow background image); Fg(p,n) may denote a pixel value of the pixel (e.g., pixel p) in a foreground image (e.g., the nth slow background image); p may denote an index of a pixel in an image (e.g., a fast background image, a slow background image, a foreground image, etc.); and n may denote an index of an image.

In response to determining that there is no candidate smoke pixel in the difference image, process 710 may proceed to acquire new image data related to the monitored area.

In some embodiments, in response to detecting one or more candidate smoke pixels in the difference image, process 710 may proceed to 716 and may identify a candidate smoke region based on the candidate smoke pixel(s). The candidate smoke region may be one or more image regions including one or more of the candidate smoke pixels. In some embodiments, the candidate smoke region may be identified by generating one or more foreground images and/or accumulating multiple foreground images. In some embodiments, a candidate smoke region may be detected using one or more morphological image processing techniques. The morphological image processing techniques may include, for example, dilation, erosion, opening, closing, the like, or a combination thereof. In some embodiments, a candidate smoke region may be detected using one or more connected component labeling techniques.

In 717, process 710 may determine whether the candidate smoke region is greater than a threshold. For example, process 710 may determine whether a percentage of the candidate smoke region is greater than a threshold. In some embodiments, in response to determining that the candidate smoke region is greater than the threshold, process 710 may proceed to 711 and may acquire new image data related to the monitored area. Additionally, process 710 may determine that the candidate smoke region may be caused by camera shake, illumination variations, or a combination thereof in some embodiments.

In response to determining that the candidate smoke region is not greater than the threshold, process 710 may proceed to 718 and may conduct color analysis on the candidate smoke region. The color analysis may be conducted based on one or more color models, such as an RGB model, a YUV model, an HSI model, etc. For example, a pixel in the candidate smoke region may have one or more color components (e.g., a first color component, a second color component, a third color components, etc.). Each of the color components can represent one or more characteristic of the pixel, such as luminance, chrominance, hue, saturation, etc. In some embodiments, the color analysis may be performed by comparing one or more color components of the pixel to one or more thresholds to determine presence of fire risk. For example, a first color component, a second color component, and a third color component of the pixel can be compared to a first threshold, a second threshold, and a third threshold, respectively. As another example, a difference between the second color component and a first predetermined value (also referred to as the "first difference") can be compared with the second threshold. A second difference between the third component and a second predetermined value (also referred to as the "second difference") can be compared with the third threshold. In some embodiments, process 710 can determine that there is a risk of fire in response to determining that the first color component is greater than the first threshold, that the first difference is less than the second threshold, and/or that the second difference is less than the third threshold. More particularly, for example, a pixel may have three color components in the YUV model, such as a Y component, a U component, and a V component. The Y component may represent gray information of the pixel. The U component and the V component may represent chrominance information of the pixel. In some embodiments, process 710 may compare the color components with three thresholds respectively. For example, process 710 may compare the Y component with a first threshold. Process 710 can also compare a difference between the U component and a first gray value (e.g., 126, 127, 128, etc.) with a second threshold. Process 710 may further compare a difference between the V component and a second gray value (e.g., 126, 127, 128, etc.) with a third threshold. In response to determining that the Y component is greater than the first threshold, that the difference between the U component and the first gray value is less than the second threshold, and/or that the difference between the V component and the second gray value is less than the third threshold, process 710 may determine there is a risk of fire. In response to determining that the Y component is less than the first threshold, that the difference between the U component and the first gray value is greater than or equal to the second threshold, or that the difference between the V component and the second gray value is greater than or equal to the third threshold, process 710 may determine that there is no risk of fire. In some embodiments, one or more of the thresholds may be determined based on environmental data. The environmental data may include temperature data, humidity data, wind data, etc. In some embodiments, in response to determining that the environmental data presents that it is easy to cause a fire, the three thresholds may be designated with a larger range. For example, if the temperature is high and the humidity is low, the three thresholds may be designated with a larger range than in a condition that the temperature is low and the humidity is high. As another example, if the wind intensity is small, the three thresholds may be designated with a larger range than in a condition that the wind intensity is big. In a more particular example, the value of the first threshold may be in a range from 90 to 110 (e.g., 90, 100, etc.), the value of the second threshold may be in a range from 12 to 18 (e.g., 13, 14, 15, etc.), and the value of the third threshold may be in a range from 12 to 18 (e.g., 13, 14, 15, etc.).

It should be noted that the above description is merely provided for the purposes of illustration, and not intended to limit the scope of the present disclosure. For persons having ordinary skills in the art, multiple variations and modifications may be made under the teachings of the present disclosure. For example, 712 and 713 may be performed simultaneously or sequentially. As another example, 717 may be not necessary and may be omitted. However, those variations and modifications do not depart from the scope of the present disclosure.

Figure 7B:
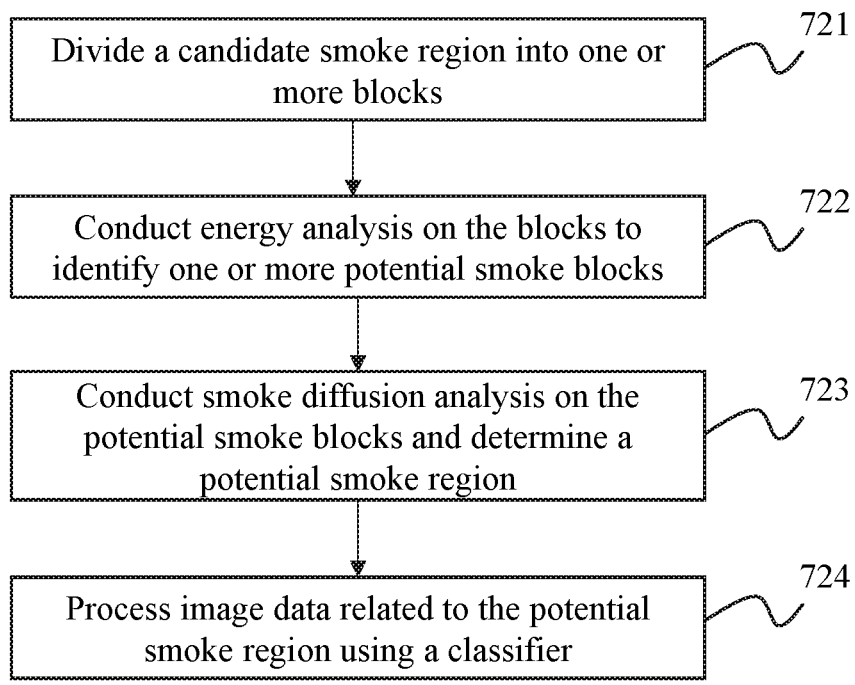
FIG. 7B is a flow diagram illustrating an example of a process for second smoke detection in accordance with some embodiments of the disclosed subject matter.

FIG. 7B is a flow diagram illustrating an example 720 of a process for conducting a second smoke detection in accordance with some embodiments of the disclosed subject matter. Process 720 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 720 can be implemented by one or more processors implementing a smoke detection unit 530 of FIG. 5.

In 721, process 720 may divide a candidate smoke region into one or more blocks. The candidate smoke region may be acquired by performing one or more operations described in connection with step 716 of process 710. Each of the blocks may have any suitable size (e.g., a particular number of pixels), shape, etc. The blocks may or may not have the same size, shape, etc. For example, the shape of one or more of the blocks may be a square, rectangle, irregular polygon, diamond, etc. In some embodiments, the size of the blocks may be 4×4, 4×2, 2×4, 8×8, 4×8, 8×4, 16×16, 10×10, 20×20, 30×30, etc.

In 722, process 720 may conduct energy analysis on the blocks to identify one or more potential smoke blocks. The potential smoke blocks may correspond to a potential presence of smoke. In some embodiments, the energy analysis may be conducted by determining one or more parameters representative of an amount of energy for each of the blocks (also referred to herein as "energy parameters"). For example, process 720 can calculate a current energy of a block (e.g., an energy of the block at a current time), an average energy of the block during a period of time, an energy variance of the block during a period of time, etc. In some embodiments, process 720 can also determine whether each of the blocks is a potential smoke block based on the energy parameter(s). For example, process 720 can compare one or more energy parameters of a block with one or more thresholds. Multiple energy parameters may be compared to multiple thresholds. In response to determining that an energy parameter of the block is less than a threshold, process 720 can determine that the block is not a potential smoke block. Alternatively, in response to determining that each of multiple energy parameters of the block is greater than a corresponding threshold, process 720 can determine that the block is a potential smoke block.

In some embodiments, the energy analysis may be conducted on a block by performing one or more wavelet transforms in time domain. For example, a two-dimensional wavelet transform may be performed on the block, and multiple subgraphs (e.g., four subgraphs) may be obtained. The subgraphs may represent a low-frequency component and one or more high-frequency components of the block. For example, three high-frequency components may be generated in a horizontal direction, a vertical direction, and a diagonal direction, respectively. A current energy, an average energy, and an energy variance may be calculated for each block based on the three high-frequency components. In some embodiments, process 720 may compare the current energy, the average energy, and the energy variance with a first threshold, a second threshold, and a third threshold, respectively. In some embodiments, in response to determining that each of the current energy, the average energy, and the energy variance is greater than a corresponding threshold, process 720 may designate the block as a potential smoke bock. In some embodiments, one or more of the thresholds may be determined based on environmental data. In some embodiments, in response to determining that the environmental data presents that it is easy to cause a fire, the three thresholds may be designated with a larger range. For example, if the temperature is high and the humidity is low, the three thresholds may be designated with a larger range than in a condition that the temperature is low and the humidity is high. As another example, if the wind intensity is small, the three thresholds may be designated with a larger range than in a condition that the wind intensity is big.

In some embodiments, a current energy of a block may be calculated based on high-frequency energy of each pixel on the block. In some embodiments, the high-frequency energy of each pixel may be calculated based on three high-frequency components. In some embodiments, an average energy of a block may be an average energy in a time period. In some embodiments, the current energy, the average energy, and the energy variance of a block may be calculated based on equations (6), (7), (8), and (9) as follows:

$$E(i, j) = HL(i, j)^2 + LH(i, j)^2 + HH(i, j)^2, \quad (6)$$

$$E_{block} = \frac{1}{N_b} \sum_{i,j} E(i, j), \quad (7)$$

$$\overline{E}_{block} = \frac{1}{n} \sum_{t=t_0}^{t_n} E_{block}, \quad (8)$$

$$Var_{block} = \frac{1}{n} \sum_{t=t_0}^{t_n} (E_{block} - \overline{E}_{block})^2, \quad (9)$$

wherein each of i and j may correspond to a coordinate of a pixel (e.g., a horizontal coordinate, a vertical coordinate, etc.); HL(i,j) may denote a high-frequency component of the energy of a pixel in a horizontal direction; LH(i,j) may denote a high-frequency component of the energy of the pixel in a vertical direction; HL(i,j) may denote a high-frequency component of the energy of the pixel in a diagonal direction; E(i,j) may denote a current energy of the pixel; $E_{block}$ may denote a current energy of a block of pixels, $N_b$ may denote the number of pixels in the block; each of $t_0$ and $t_n$ may denote a time instant; n may be the number of time instants during a time period from $t_0$ to $t_n$; $\overline{E}_{block}$ may denote an average energy of the block in a time period from $t_0$ to $t_n$; and $Var_{block}$ may denote an energy variance of the block during the time period from $t_0$ to $t_n$.

In 723, process 720 may conduct smoke diffusion analysis on the potential smoke blocks and determine a potential smoke region. The potential smoke region may include one or more potential smoke blocks. In some embodiments, the smoke diffusion analysis may be conducted based on the number of the potential smoke blocks in a region. In some embodiments, process 720 may calculate the number of potential smoke blocks in a region. In some embodiments, the region may be a candidate smoke region. In some embodiments, in response to determining that the number of the potential smoke blocks in a time period is increasing, the region may be designated as a potential smoke region.

In 724, process 720 may process image data related to the potential smoke region using a classifier. The classifier may include Decision Tree, Bayesian Classifier, Artificial Neural Networks (ANN), k-Nearest Neighbors (KNN), Mining in database (MIND), Grouping and Counting-relational database (GAC-RDB), Association Rule, or Support Vector Machine (SVM). In some embodiments, process 720 may extract dynamic texture features from the image data related to the potential smoke region and classify the dynamic texture features. In some embodiments, process 720 may determine whether the classified dynamic texture features satisfy a dynamic texture model. In some embodiments, the dynamic texture model may relate to one or more parameters. In some embodiments, the parameters may be determined based on environmental data. In some embodiments, in response to determining the classified dynamic texture features satisfy the parameters, the region may be designated as a smoke region.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8A:
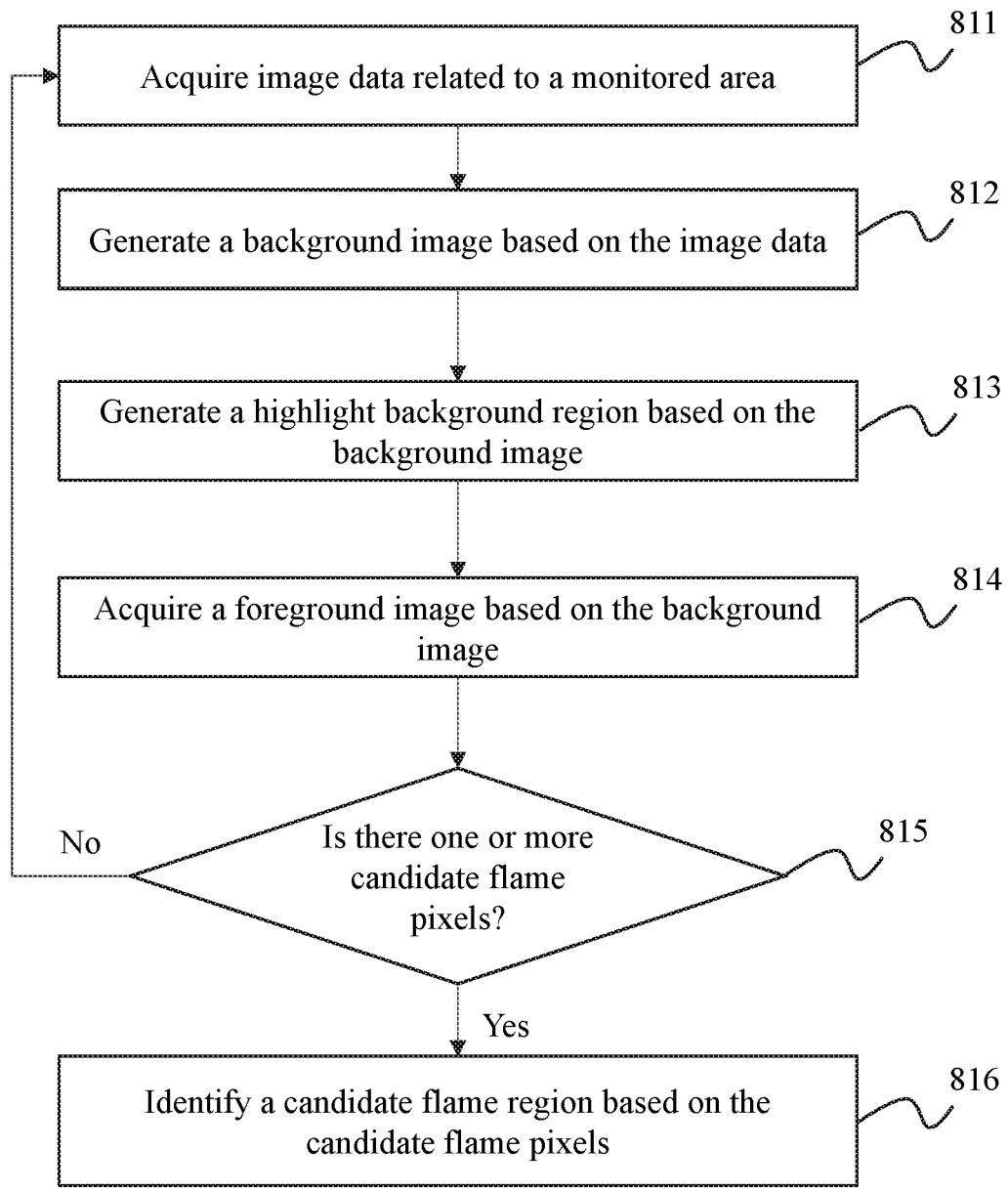
FIG. 8A is a flow diagram illustrating an example of a process for first flame detection in accordance with some embodiments of the disclosed subject matter.

FIG. 8A is a flow diagram illustrating an example 810 of a process for first flame detection in accordance with some embodiments of the disclosed subject matter. Process 810 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 810 can be implemented by one or more processors implementing a flame detection unit 540 of FIG. 5.

In 811, process 810 may acquire image data related to a monitored area. The image data may include one or more video frames, a sequence of images, etc. In some embodiments, the image data may be color or gray image data. In some embodiments, the image data related to a monitored area may be part or all of the image data acquired in 602 or in 603.

In 812, process 810 may generate a background image based on the image data. For example, process 810 may initialize a background image. In a more particular example, process 810 may designate an image in the image data as the background image. The designated image may be, for example, a first image of a group of images, an image representative of a video scene (e.g., an I-frame, a key frame, etc.), a random image, and/or any other image in the image data. In another more particular example, process 810 may generate the background image by averaging multiple images (e.g., frames). The multiple image may be averaged, for example, by determining average pixel values of the multiple frames. In still another more particular example, process 810 may generate the background image by determining a median frame of multiple frames. The median frame may be an intermediate frame in the multiple frames. Process 810 may generate the background image by updating a previously generated background image (e.g., an initial background image, a previously updated background image, etc.). In some embodiments, process 810 may update the background image periodically. For example, the background image may be updated every frame, every few frames, etc. In some embodiments, process 800 may update the background image based on the current image, the updated image, the current foreground image, etc. For example, the background image may be updated by increasing, decreasing, or maintaining the gray value of a pixel in the background image. In a more particular example, the gray value of a pixel in the background image may be increased by a given value (e.g., 1, 2, 3, etc.). In still another more particular example, the gray value of a pixel in the background image may be decreased by a given value (e.g., 1, 2, 3, etc.). In some embodiments, the background image may be updated based on equation (10) as follows:

$$Bg(p, n+1) = \begin{cases} Bg(p,n) + 1 & \text{if} \begin{pmatrix} Img(p,n) > Bg(p,n) \text{ and} \\ Fg(p,n) == 0 \end{pmatrix} \\ Bg(p,n) - 1 & \text{if} \begin{pmatrix} Img(p,n) < Bg(p,n) \text{ and} \\ Fg(p,n) == 0 \end{pmatrix} , \\ Bg(p,n) & \text{otherwise} \end{cases} \quad (10)$$

wherein Bg(p,n) may denote a pixel value of a pixel (e.g., pixel p) in a current background image (e.g., the nth background image); Img(p,n) may denote a pixel value of the pixel in a current image (e.g., the nth image); Fg(p,n) may denote a pixel value of the pixel in a current foreground image (e.g., the nth foreground image); Bg(p,n+1) may denote a pixel value of the pixel in an updated background image (e.g., the (n+1)th background image); p may denote an index of a pixel in an image (e.g., a current background image, a current image, a current foreground image, an updated background image, etc.); and n may denote an index of an image.

In 813, process 810 may generate a highlight background image based on the background image. The highlight background image may include one or more portions of the background image and may include any number of pixels. In some embodiments, the highlight background image may be generated by identifying one or more portions of the background image that have greater pixel values (e.g., gray values) in the background image. In some embodiments, the highlight regions may be acquired using one or more thresholding methods, clustering methods, compression-based methods, histogram-based methods, edge detection, region-growing methods, Chan-Vese model, any other method for image segmentation and/or processing, or a combination thereof. In some embodiments, the highlight background region may be processed based on morphological image processing. The morphological image processing may include dilation, erosion, or a combination thereof. In some embodiments, the highlight background image may be obtained by thresholding the background image based on equation (11) as follows:

$$Bg_{bright}(p, n) = \begin{cases} 255 & \text{if } (Bg(p,n) > thr) \\ 0 & \text{otherwise} \end{cases}, \quad (11)$$

wherein Bg(p,n) may denote a pixel value of a pixel in a current background image; thr may denote a threshold of pixel value; and $Bg_{bright}(p,n)$ may denote a pixel value of the pixel in a current highlight background region. In some embodiments, the value of thr may be in a range from 190 to 220 (e.g., 200, 210, etc.).

In 814, process 810 may acquire a foreground image based on the background image. In some embodiments, the foreground image may be acquired by background subtraction. For example, the foreground image may be acquired by generating a difference image between an image and a background image. In some embodiments, the foreground image may be processed by thresholding and/or normalization the background image. For example, in response to determining that a pixel value of a pixel in the foreground image is not greater than or equal to a threshold, process 810 can assign a first value to the pixel (e.g., "255" or any other suitable value). Alternatively, in response to determining that the pixel value is less than the threshold, process 810 can assign a second value to the pixel (e.g., "0" or any other suitable value). The pixel value may represent a difference between pixel values of corresponding pixels in an image and a background image. The threshold may have any suitable value. For example, the threshold may be in a range from 10 to 30 (e.g., 10, 20, 30, etc.) More particularly, for example, the foreground image may be identified based on equation (10) as follows:

$$Fg(p, n) = \begin{cases} 255 & \text{if } |Img(p,n) - (Bg(p,n)| \geq thr) \\ 0 & \text{otherwise} \end{cases}, \quad (12)$$

wherein Img(p,n) may denote a pixel value of a pixel in a current image; Bg(p,n) may denote a pixel value of the pixel in a current background image; thr may denote a threshold;

Fg(p,n) may denote a pixel value of a pixel in a current foreground image; p may denote an index of a pixel in an image (e.g., a current background image, a current image, a current foreground image, etc.); and n may denote an index of an image. In some embodiments, the value of thr may be in a range from 10 to 30, for example, 10, 20, 30, etc.

In 815, process 810 may determine whether there is one or more candidate flame pixels. As referred herein, the candidate flame pixels are pixels that may correspond to the presence of flame. The determination may be made based on the foreground image and the highlight background image. For example, process 810 may determine a given pixel as being a candidate flame pixel in response to determining that the given pixel is in a current foreground image and the highlight background image. In some embodiments, the pixel values of the candidate flame pixels may be determined based on pixel values of the foreground image and pixel values of the highlight background image. In some embodiments, the candidate flame pixels may be obtained by performing an "AND" operation on a current foreground image and a highlight background image based on equation (13) as follows:

$$Fg_{interest}(p,n) = Fg(p,n) \& Bg_{bright}(p,n), \quad (13)$$

wherein Fg(p,n) may denote a pixel value of a pixel in a current foreground image; $Bg_{bright}(p,n)$ may denote a pixel value of the pixel in a current highlight background region; and $Fg_{interest}(p,n)$ may denote a pixel value of the pixel in a candidate flame region; p may denote an index of a pixel in an image (e.g., a current foreground image, a current highlight background image an updated background image, etc.); and n may denote an index of an image.

In response to determining that there is no candidate flame pixel, process 810 may proceed to acquire new image data related to a monitored area. Alternatively, in response to detecting one or more candidate flame pixels, process 810 may proceed to 816 and may identify a candidate flame region based on the candidate flame pixels. In some embodiments, the candidate flame region may be identified based on equation (13).

It should be noted that the above description is merely provided for the purposes of illustration, and not intended to limit the scope of the present disclosure. For persons having ordinary skills in the art, multiple variations and modifications may be made under the teachings of the present disclosure. For example, 813 and 814 may be performed simultaneously or sequentially. However, those variations and modifications do not depart from the scope of the present disclosure.

Figure 8B:
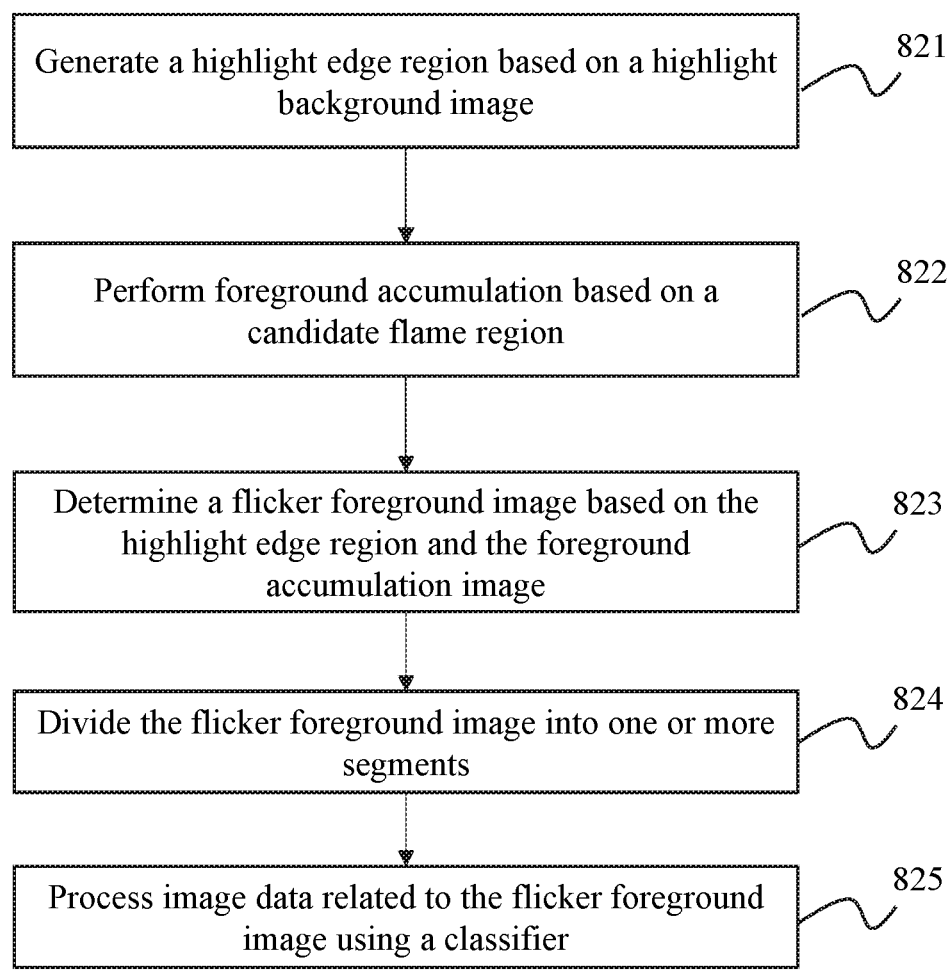
FIG. 8B is a flow diagram illustrating an example of a process for second flame detection in accordance with some embodiments of the disclosed subject matter.

FIG. 8B is a flow diagram illustrating an example 820 of a process for second flame detection in accordance with some embodiments of the disclosed subject matter. Process 820 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 820 can be implemented by one or more processors implementing a flame detection unit 540 of FIG. 5.

In 821, process 820 may generate a highlight edge region based on a highlight background image. The highlight background image may be generated by performing one or more operations described in connection with step 813 of FIG. 8A. The highlight edge region may include one or more portions of the highlight background image representative of edges in the highlight background image. In some embodiments, the highlight edge region may be generated by processing a highlight background image using one or more morphological image processing techniques. The morphological image processing techniques may include dilation, erosion, opening, closing, any other processing of geometrical structures of one or more images, or a combination thereof. For example, process 820 may process the highlight background image through dilation and generate a first highlight background image. As another example, process 820 may process the highlight background image through erosion and generate a second highlight background image. In some embodiments, the highlight edge region may be generated by performing image differencing on the first highlight background image and the second highlight background image.

In 822, process 820 may perform foreground accumulation based on a candidate flame region. The candidate flame region may be identified by performing one or more operations described in connection with FIG. 8A. Process 820 may generate a foreground accumulation image by performing the foreground accumulation. For example, each pixel value (e.g., gray value) of the foreground accumulation image may be determined by performing foreground accumulation on one or more foreground images (e.g., a first foreground image, a second foreground image, etc.). More particularly, for example, process 820 can accumulate the pixel value of a given pixel in the foreground accumulation image by a first value (e.g., "1," "2," etc.) in response to determining that the pixel values of corresponding pixels in multiple foreground images are different. Each of the corresponding pixels and the given pixel may have the same coordinates (e.g., a horizontal coordinate, a vertical coordinate, etc.). Alternatively, in response to determining that the pixel values of the corresponding pixels in the foreground images are the same, the pixel value of the given pixel in the foreground accumulation image may be accumulated by a second value (e.g., −2, −1, etc.). In a more particular example, in response to determining the pixel value of a first corresponding pixel in a current foreground image and the pixel value of a second corresponding pixel in a previous foreground image are different, the pixel value of the given pixel in the foreground accumulation image may be incremented by "2" or any other suitable value. Alternatively, in response to determining that the pixel value of the first corresponding pixel in the current foreground image and the pixel value of the second corresponding pixel in the previous foreground image are the same, the pixel value of the given pixel in the foreground accumulation image may be incremented by "−1" any other suitable value. In some embodiments, the foreground accumulation image may be generated by performing foreground accumulation on multiple foreground images corresponding to a time period (e.g., from time instant $t_0$ to time instant $t_n$). In some embodiments, the foreground accumulation image may be generated based on equation (14) as follows:

$$Fg_{accu}(p, n) = \sum_{t=t_0}^{t_n} ((Fg(p, n) \oplus Fg_{last}(p, n)) == 1\,?\,2 : -1), \quad (14)$$

wherein Fg(p,n) may denote a pixel value of a pixel in a current foreground image; $Fg_{last}(p,n)$ may denote a pixel value of the pixel in a previous foreground image; $Fg_{accu}(p,n)$ may denote a pixel value of the pixel in an accumulation foreground image; each of $t_0$ and $t_n$ may denote a time instant; p may denote an index of a pixel in an image (e.g., a current foreground image, a last foreground image, an accumulation foreground image, etc.); and n may denote an index of an image.

In 823, process 820 may determine a flicker foreground image based on the highlight edge region and the foreground accumulation image. In some embodiments, the pixel values of the flicker foreground image may be determined based on pixel values of the foreground accumulation image and pixel values of the highlight edge region. In some embodiments, the flicker foreground image may be obtained by performing an "AND" operation on the highlight edge region and the foreground accumulation image based on equation (15) as follows:

$$Fg_{final}(p,n)=Fg_{accu}(p,n) \& Bg_{bright\_edge}(pn,n), \quad (15)$$

wherein $Fg_{accu}(p,n)$ may denote a pixel value of a pixel in an accumulation foreground image; $Bg_{bright\_edge}(p,n)$ may denote a pixel value of the pixel in a highlight edge region; $Fg_{final}(p,n)$ may denote a pixel value of the pixel in a flicker foreground image; p may denote a pixel in an image (e.g., a highlight edge region, a flicker foreground image, an accumulation foreground image, etc.); and n may denote an index of an image.

In 824, process 820 may divide the flicker foreground image into one or more segments. The segment may be marked as a candidate flame segment. In 825, process 820 may process image data related to the flicker foreground image using a classifier. The image data related to the flicker foreground image may include the candidate flame segment. The classifier may be configured to classify features related to the flicker foreground image into one or more classes (e.g., a class corresponding to the presence of flame, a class corresponding to the absence of flame, etc.). The classifier may include Decision Tree, Bayesian Classifier, Artificial Neural Networks (ANN), k-Nearest Neighbors (KNN), Mining in database (MIND), Grouping and Counting-relational database (GAC-RDB), Association Rule, or Support Vector Machine (SVM). In some embodiments, process 820 may extract dynamic texture features from the image data related to the flicker foreground image and classify the dynamic texture features. In some embodiments, process 820 may determine whether the classified dynamic texture features satisfy a dynamic texture model. In some embodiments, the dynamic texture model may relate to one or more parameters. In some embodiments, the parameters may be determined based on environmental data. In some embodiments, in response to determining the classified dynamic texture features satisfy the parameters, the region may be designated as a flame region.

It should be noted that the above description is merely provided for the purposes of illustration, and not intended to limit the scope of the present disclosure. For persons having ordinary skills in the art, multiple variations and modifications may be made under the teachings of the present disclosure. For example, 821 and 822 may be performed simultaneously or sequentially. However, those variations and modifications do not depart from the scope of the present disclosure.

Figure 9:
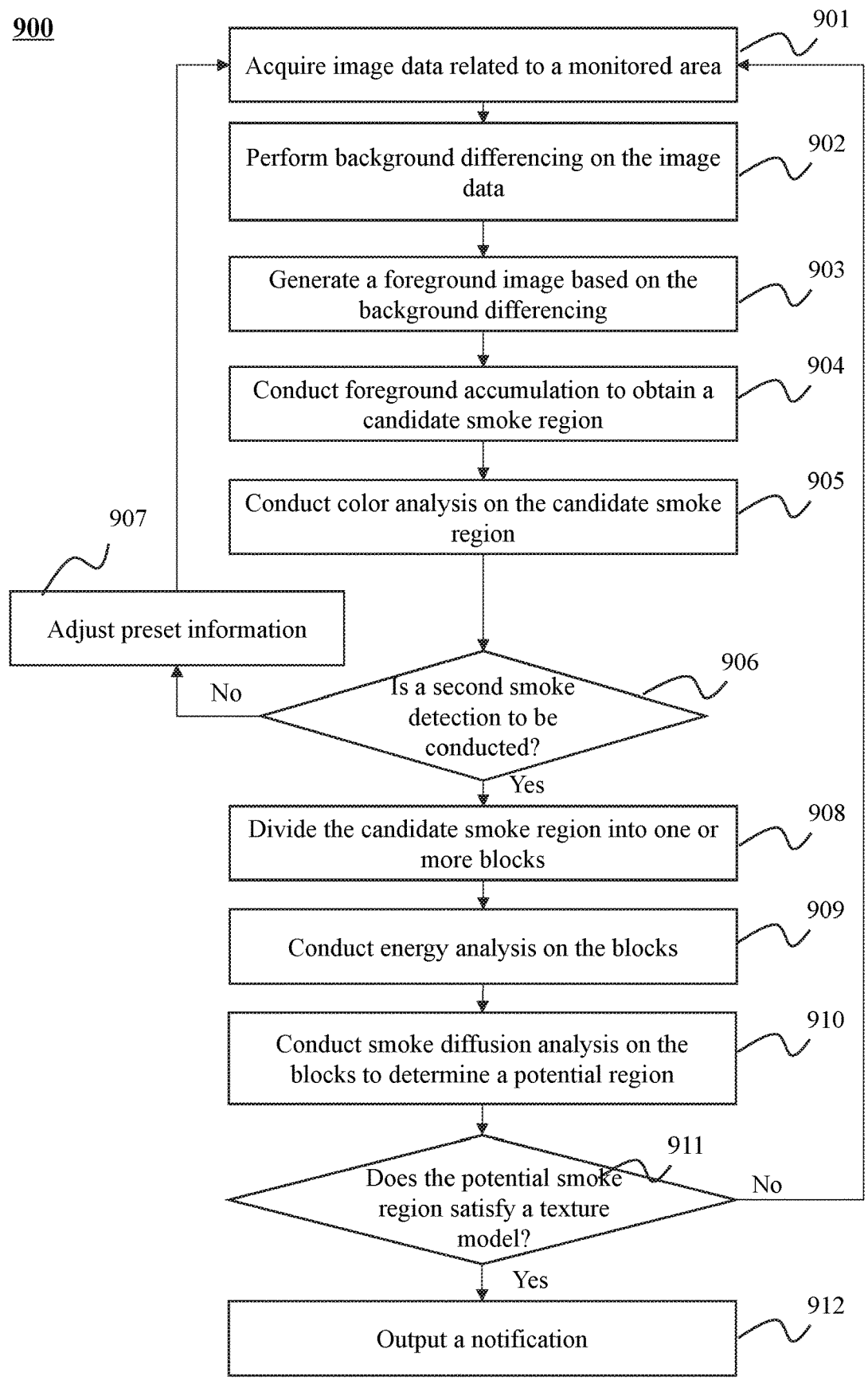
FIG. 9 is a flow diagram illustrating an example of a process for smoke detection in accordance with some embodiments of the disclosed subject matter.

FIG. 9 is a flow diagram illustrating an example 900 of a process for smoke detection in accordance with some embodiments of the disclosed subject matter. Process 900 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 900 can be implemented by one or more processors implementing an analysis module 230 of FIG. 2.

In 901, process 900 may acquire image data related to a monitored area. In some embodiments, process 900 may acquire environmental data related to the monitored area.

In 902, process 900 may perform background differencing on the image data. In some embodiments, background differencing may be performed as described in connection with steps 712, 713 and 714 of FIG. 7A.

In 903, process 900 may generate a foreground image based on the background differencing. In some embodiments, the foreground image may be generated based on a difference image representative of differences between a slow background image and a fast background image. In some embodiments, the foreground image may be generated by thresholding the difference image.

In 904, process 900 may conduct foreground accumulation to obtain a candidate smoke region. In some embodiments, the foreground accumulation image may be processed based on morphological image processing, connected component labeling, or a combination thereof.

In 905, process 900 may conduct color analysis on the candidate smoke region. For example, the color analysis may be conducted based on a color model (e.g., a YUV model). In some embodiments, the color analysis may be performed as described in connection with 718.

In 906, process 900 may determine whether a second smoke detection is to be conducted. In some embodiments, the determination may be made as described in connection with steps 606 and 607 of FIG. 6. In response to determining that a second smoke detection is not to be conducted, process 900 may proceed to 907 and may adjust preset information. In some embodiments, the preset information may be adjusted by centering the location of the motion region in an image, making a motion region percentage within the threshold, etc. In response to determining that a second smoke detection is to be conducted, process 900 may proceed to 908 and may divide the candidate smoke region into one or more blocks. In 909, process 900 may conduct energy analysis on the blocks. Process 900 may determine one or more potential smoke blocks. In some embodiments, the energy analysis may be conducted based on wavelet transform. In some embodiments, the energy analysis may be conducted as described in connection with 722 of FIG. 7B. In 910, process 900 may conduct smoke diffusion analysis on the blocks to determine a potential region. In some embodiments, the smoke diffusion analysis may be conducted based on the number of potential smoke blocks increasing, decreasing, or maintaining in a time period. In some embodiments, in response to determining the number of potential smoke blocks is increasing, the candidate smoke region may be designated as a potential smoke region. In 911, process 900 may determine whether the potential smoke region satisfies a texture model. In some embodiments, process 900 may extract and classify dynamic texture features using a classifier that can classify the extracted texture features into one or more classes (e.g., a class corresponding to the presence of smoke, a class corresponding to the absence of smoke, etc.). The classifier may include, for example, an SVM. In response to determining the potential smoke region does not satisfy a texture model, process 900 may proceed to 901. In response to determining the potential smoke region satisfies a texture model, process 900 may proceed to 912 and may output a notification.

It should be noted that the color analysis in 905, the energy analysis in 909 and the texture analysis in 911 may relate to one or more parameters. In some embodiments, the one or more parameters may be determined based on environmental data. In some embodiments, if the environmental data presents that it is easy to cause a fire, the one or more parameters may be designated with a larger range.

Figure 10:
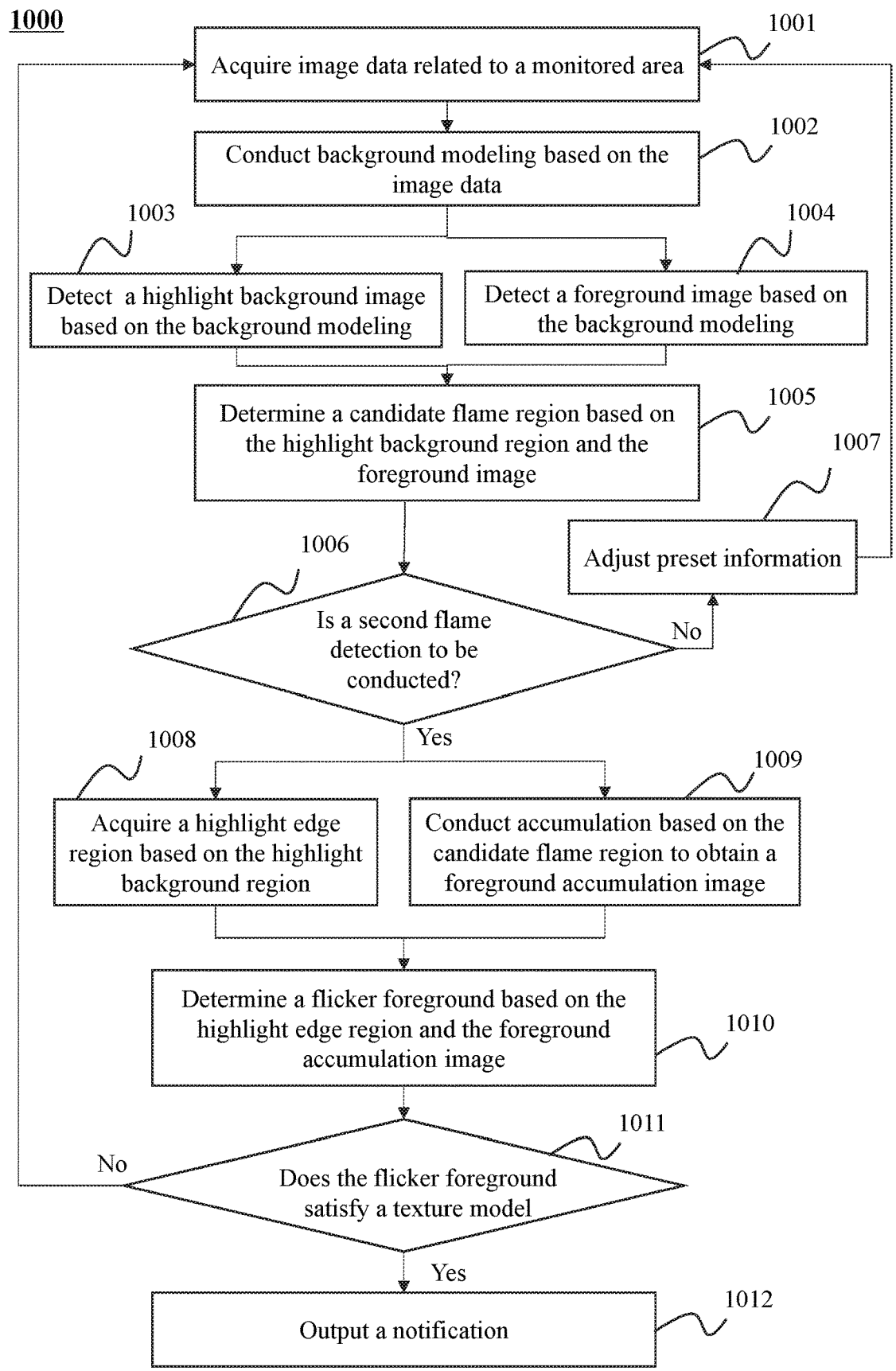
FIG. 10 is a flow diagram illustrating an example of a process for flame detection in accordance with some embodiments of the disclosed subject matter.

FIG. 10 is a flow diagram illustrating an example 1000 of a process for flame detection in accordance with some embodiments of the disclosed subject matter. Process 1000 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 1000 can be implemented by one or more processors implementing an analysis module 230 of FIG. 2.

In 1001, process 1000 may acquire image data related to a monitored area. In some embodiments, process 1000 may acquire environmental data related to a monitored area. In 1002, process 1000 may conduct background modeling based on the image data. Process 1000 may determine a background image. In some embodiments, the background modeling may be performed as described in connection with 812. In 1003, process 1000 may detect a highlight background image based on the background modeling. In some embodiments, the highlight background region may be detected based on thresholding method. In some embodiments, the highlight background region may be detected as described in connection with 813. In 1004, process 1000 may detect a foreground image based on the background modeling. In some embodiments, the foreground image may be detected based on background subtraction. In some embodiments, the foreground image may be detected as described in connection with 814. In 1005, process 1000 may determine a candidate flame region based on the highlight background region and the foreground image. In some embodiments, the candidate flame region may be detected as described in connection with 816. In 1006, process 1000 may determine whether a second flame detection is to be conducted. The determination may be performed in connection with 612 and 613. In response to determining a second flame detection is not to be conducted, process 100 may proceed to 1007 and may adjust preset information. In some embodiments, the preset information may be adjusted by centering the location of the motion region in an image, or making a motion region percentage within the threshold. In response to determining a second smoke detection is to be conducted, process 1000 may proceed to 1008 and may acquire a highlight edge region based on the highlight background region. The highlight edge region may be acquired as described in connection with 821. In 1009, process 1000 may conduct accumulation based on the candidate flame region to obtain a foreground accumulation image. The foreground accumulation image may be obtained as described in connection with 822. In 1010, process 1000 may determine a flicker foreground based on the highlight edge region and the foreground accumulation image. The flicker foreground may be determined as described in connection with 823. In 1011, process 1000 may determine whether the flicker foreground satisfies a texture model. In some embodiments, process 1000 may extract and classify dynamic texture features using a classifier (e.g., an SVM). In response to determining the flicker foreground does not satisfy a texture model, process 1000 may proceed to 1001. In response to determining the flicker foreground satisfies a texture model, process 1000 may proceed to 1012 and output a notification.

It should be noted that the texture analysis in 1000 may relate to one or more parameters. In some embodiments, the one or more parameters may be determined based on environmental data. In some embodiments, if the environmental data presents that it is easy to cause a fire, the one or more parameters may be designated with a large range. In some embodiments, steps 1003 and 1004 may be performed simultaneously or sequentially. Steps 1008 and 1009 may be performed simultaneously or sequentially.

It should be noted that the above steps of the flow diagrams of FIGS. 3 and 6-10 can be executed or performed in any order or sequence not limited to the order and sequence shown and described in the figures. Also, some of the above steps of the flow diagrams of FIGS. 3 and 6-10 can be executed or performed substantially simultaneously where appropriate or in parallel to reduce latency and processing times. Furthermore, it should be noted that FIGS. 3 and 6-10 are provided as examples only. At least some of the steps shown in these figures can be performed in a different order than represented, performed concurrently, or altogether omitted.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "generating," "providing," "calculating," "executing," "storing," "producing," "determining," "obtaining," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read-only memory (EPROM), electrically erasable programmable read-only memory (EEPROM), etc.), any suitable media that is not fleeting or devoid of any semblance of permanence during transmission, and/or any suitable tangible media. As another example, transitory computer readable media can include signals on networks, in connectors, conductors, optical fibers, circuits, any suitable media that is fleeting and devoid of any semblance of permanence during transmission, and/or any suitable intangible media.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties such as molecular weight, reaction conditions, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for fire detection, comprising:
acquiring image data related to a monitored area;
determining, based on a time at which the image data is captured or grey values of the acquired image data, whether a first mode corresponding to daytime or a second mode corresponding to nighttime is to be executed for fire detection, wherein the first mode comprises a first smoke detection and a second smoke detection, and the second mode comprises a first flame detection;

wherein performing the first smoke detection comprises:
  updating, based on the image data, a first background image at a first update rate;
  updating, based on the image data, a second background image at a second update rate that exceeds the first update rate;
  generating a difference image between the updated first background image and the updated second background image;
  identifying a candidate smoke region from the difference image, pixel values of pixels in the candidate smoke region exceed a threshold; and
  determining whether the second smoke detection needs to be executed by determining whether there is a risk of fire in the candidate smoke region by
  conducting color analysis on the candidate smoke region.

2. The method of claim 1, wherein the determining whether the first mode or the second mode is to be executed comprises:
  determining, based on the time at which the image data is captured or the grey values of the acquired image data, whether the acquired image data corresponds to daytime or nighttime; and
  determining whether the first mode corresponding to daytime or the second mode corresponding to nighttime is to be executed based on the determination of whether the acquired image data corresponds to daytime or nighttime.

3. The method of claim 1, wherein the performing the second smoke detection comprises:
  dividing the candidate smoke region into a plurality of blocks;
  conducting at least one of a smoke energy analysis or a smoke diffusion analysis on the plurality of blocks; and
  determining a potential smoke region based on a result of the at least one of the smoke energy analysis or the smoke diffusion analysis.

4. The method of claim 3, wherein the second smoke detection further comprises determining whether the potential smoke region is a smoke region by processing a portion of the image data that relates to the potential smoke region using a classifier.

5. The method of claim 1, wherein the first flame detection comprises:
  generating a background image based on the image data;
  generating a highlight background region based on the background image;
  producing a foreground image based on the background image; and
  identifying a candidate flame region based on at least one of the highlight background region or the foreground image.

6. The method of claim 5, wherein the second mode further comprises a second flame detection, and wherein the second flame detection comprises:
  acquiring a highlight edge region related to the highlight background region;
  identifying a foreground accumulation image based on the candidate flame region;
  determining a flicker foreground image based on at least one of the highlight edge region or the foreground accumulation image; and
  processing image data related to the flicker foreground image using a classifier.

7. The method of claim 1, further comprising identifying a portion of the image data corresponding to an area for the fire detection by performing a skyline detection on the image data.

8. The method of claim 1, wherein the identifying a candidate smoke region based on the difference image comprises:
  determining whether one or more smoke pixels exist in the difference image by comparing the pixel value of each pixel of the difference image with the threshold;
  in response to determining that one or more smoke pixels exist in the difference image, generating one or more foreground images based on the difference image; and
  identifying the candidate smoke region based on the one or more foreground images.

9. The method of claim 8, wherein:
  the one or more foreground images comprise a plurality of foreground images, and
  the identifying the candidate smoke region based on the one or more foreground images comprises identifying the candidate smoke region by accumulating the plurality of foreground images.

10. A system for fire detection, comprising:
  a storage device; and
  a hardware processor operatively coupled to the storage device and configured to:
    acquire image data related to a monitored area;
    determine, based on a time at which the image data is captured or grey values of the acquired image data, whether a first mode corresponding to daytime or a second mode corresponding to nighttime is to be executed for fire detection, wherein the first mode comprises a first smoke detection and a second smoke detection;
    wherein performing the first smoke detection comprises:
      updating, based on the image data, a first background image at a first update rate;
      updating, based on the image data, second background image at a second update rate that exceeds the first update rate;
    generating a difference image between the updated first background image and the updated second background image;
    identifying a candidate smoke region based on the difference image, pixel values of pixels in the candidate smoke region exceed a threshold; and
    determining whether the second smoke detection needs to be executed by determining whether there is a risk of fire in the candidate smoke region by
    conducting color analysis on the candidate smoke region.

11. The system of claim 10, wherein to determine whether the first mode or the second mode is to be executed, the hardware processor is further configured to determine, based on the time at which the image data is captured or the grey values of the acquired image data, whether the acquired image data corresponds to daytime or nighttime; and
  determining whether the first mode corresponding to daytime or the second mode corresponding to nighttime is to be executed based on the determination of whether the acquired image data corresponds to daytime or nighttime.

12. The system of claim 10, wherein the performing the second smoke detection comprises:

dividing the candidate smoke region into a plurality of blocks;

conducting at least one of a smoke energy analysis or a smoke diffusion analysis on the plurality of blocks; and determining a potential smoke region based on a result of the at least one of the smoke energy analysis or the smoke diffusion analysis.

13. The system of claim 12, wherein to conduct the second smoke detection, the hardware processor is further configured to determine whether the potential smoke region is a smoke region by processing a portion of the image data that relates to the potential smoke region using a classifier.

14. The system of claim 10, wherein to conduct the first flame detection, the hardware processor is further configured to:

generate a background image based on the image data;

generate a highlight background region based on the background image;

produce a foreground image based on the background image; and identify a candidate flame region based on at least one of the highlight background region or the foreground image.

15. The system of claim 14, wherein to execute the second mode, the hardware processor is further configured to conduct a second flame detection by:

acquiring a highlight edge region related to the highlight background region;

generating a foreground accumulation image based on the candidate flame region;

determining a flicker foreground image based on at least one of the highlight edge region or the foreground accumulation image; and processing image data related to the flicker foreground image using a classifier.

16. The system of claim 10, wherein the hardware processor is further configured to identify a portion of the image data corresponding to an area for the fire detection by performing a skyline detection on the image data.

17. The system of claim 10, wherein the hardware processor is further configured to:

determine whether one or more smoke pixels exist in the difference image by comparing the pixel value of each pixel of the difference image with the threshold;

in response to determining that one or more smoke pixels exist in the difference image, generate one or more foreground images based on the difference image; and identify the candidate smoke region based on the one or more foreground images.

18. The system of claim 17, wherein:

the one or more foreground images comprise a plurality of foreground images, and the identifying the candidate smoke region based on the one or more foreground images comprises identifying the candidate smoke region by accumulating the plurality of foreground images.

* * * * *